United States Patent
Takeda et al.

(10) Patent No.: US 6,341,103 B1
(45) Date of Patent: Jan. 22, 2002

(54) OPTICAL DISK APPARATUS CAPABLE OF CORRECTING THE DRIVE CURRENT WAVEFORMS OF STEPPING MOTOR

(75) Inventors: Ryuji Takeda; Seiichiro Oishi, both of Tokyo; Tetsuhiro Shiomi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/500,215

(22) Filed: Feb. 8, 2000

(30) Foreign Application Priority Data

Feb. 9, 1999 (JP) .......................................... 11-031634

(51) Int. Cl.$^7$ .............................................. G11B 17/22
(52) U.S. Cl. ........................................ 369/32; 369/215
(58) Field of Search ........................... 369/32, 33, 215, 369/44.28, 44.27, 44.29

(56) References Cited

U.S. PATENT DOCUMENTS

| 4,964,111 A | * | 10/1990 | Hangai et al. ............... 369/215 |
| 5,077,716 A | * | 12/1991 | Takeda et al. ................. 369/32 |
| 5,175,716 A | * | 12/1992 | Min ........................ 369/44.11 |
| 5,563,856 A | * | 10/1996 | Kim ............................. 369/32 |
| 5,675,560 A | * | 10/1997 | Ogino .......................... 369/32 |
| 5,726,959 A | * | 3/1998 | Yu .............................. 369/32 |
| 5,802,019 A | * | 9/1998 | Yamada ........................ 369/32 |
| 5,808,982 A | * | 9/1998 | Yun ......................... 369/44.28 |
| 6,137,751 A | * | 10/2000 | Kim ............................. 369/32 |

* cited by examiner

Primary Examiner—Tan Dinh
(74) Attorney, Agent, or Firm—Frommer Lawrence & Haug LLP; William S. Frommer; Glenn F. Savit

(57) ABSTRACT

A slide-feed drive part (27) uses a stepping motor as a slide-feed motor for changing the position of a optical pick-up (3) with respect to the rotation surface of an optical disk (1), and has a micro-controller (31) provided therein and a slide-feed motor controller (32) both for correcting drive current waveforms to drive the stepping motor. Therefore, by correcting the motor driving waveforms, the optical pick-up (3) can be linearly moved with respect to the rotation of the slide-feed motor (14). It is thereby possible to do away with a position sensor and make a fine positional control of the optical pick-up (3) with no variation. As a result of this, it is possible to provide an optical disk driving apparatus, an optical disk driving method, and an optical disk apparatus, which enhances the linearity of the rotation of the motor with a simple construction.

13 Claims, 17 Drawing Sheets

| Number of Steps | Magnetic-Excitation Coil | Tr1 | Tr2 | Tr3 | Tr4 | Angle of Rotation |
|---|---|---|---|---|---|---|
| 1 | L1 | ON | | | | 90° |
| 2 | L2 | | ON | | | 180° |
| 3 | L3 | | | ON | | 270° |
| 4 | L4 | | | | ON | 360° |
| 5 | L1 | ON | | | | 450° |

FIG. 9

| Step | Distance (Theory) | Corrected Step | Electrical Angle θ | A-cos θ | 8-bit | bit(cos) | B-sin θ | 8-bit | bit(sin) |
|---|---|---|---|---|---|---|---|---|---|
| 0 | 0 | 0 | 0 | 1 | 127 | 127 | 0 | 0 | 0 |
| 1 | 0.0060469 | 0.188849 | 2.1205 13 | 0.9993 15 | 126.913 | 127 | 0.037001 | 4.699188 | 5 |
| 2 | 0.0120938 | 0.388983 | 4.385588 | 0.997072 | 126.6281 | 127 | 0.076468 | 9.711464 | 10 |
| 3 | 0.0181406 | 0.607779 | 6.837638 | 0.992888 | 126.0967 | 126 | 0.119056 | 15.12014 | 15 |
| 4 | 0.0241875 | 0.842544 | 9.478575 | 0.986347 | 125.2661 | 125 | 0.164679 | 20.91421 | 21 |
| 5 | 0.0302344 | 1.09779 | 12.35 1388 | 0.976851 | 124.06605 | 124 | 0.213906 | 27.16661 | 27 |
| 6 | 0.0362813 | 1.38 12 | 15.53385 | 0.963451 | 122.35582 | 122 | 0.267886 | 34.02 15036 | 34 |
| 7 | 0.0423281 | 1.706 | 19.1925 | 0.944419 | 119.94 13 | 120 | 0.328743 | 41.75036 | 42 |
| 8 | 0.048375 | 2.10653 | 23.698 13 | 0.915676 | 116.29 1908 | 116 | 0.40 1918 | 51.04356 | 51 |
| 9 | 0.0544219 | 2.6607 | 29.932888 | 0.866611 | 110.05995 | 110 | 0.498985 | 63.37 1583 | 63 |
| 10 | 0.0604688 | 4.15563 | 46.758388 | 0.685077 | 87.004472 | 87 | 0.728471 | 92.5 15 1659 | 93 |
| 11 | 0.0665156 | 6.08892 | 68.503035 | 0.366444 | 46.538844 | 47 | 0.930544 | 118.16 1945 | 118 |
| 12 | 0.0725625 | 6.85333 | 77.099635 | 0.223256 | 28.353357 | 28 | 0.974766 | 123.79397 | 124 |
| 13 | 0.0786094 | 7.37334 | 82.949635 | 0.122742 | 15.588823 | 16 | 0.99243 19 | 126.03765 | 126 |
| 14 | 0.0846563 | 7.77754 | 87.473225 | 0.044086 | 5.598895 | 6 | 0.99902 18 | 126.87649 | 127 |
| 15 | 0.090703 1 | 8.08454 | 90.725663 | -0.012663 | -1.608938 | -2 | 0.999992 | 126.898 18 | 127 |
| 16 | 0 | 8.26605 | 92.930063 | -0.05 1 158 | -6.49693 1 | -6 | 0.99869 18 | 126.83339 | 127 |
| 17 | 0.0967675 | 8.43654 | 94.90995 | -0.12019 | -15.26264 | -15 | 0.99276 19 | 126.0794 | 127 |
| 18 | 0.1027969 | 8.6 1336 | 96.90903 | -0.15647 | -19.8721 | -20 | 0.98776 19 | 125.43656 | 126 |
| 19 | 0.108843 8 | 8.80002 | 99.00225 | -0.19472 | -24.73 | -25 | 0.98085 19 | 124.569 | 125 |
| 20 | 0.1 148906 | 8.99981 | 101.22886 | -0.234 19 | -29.7421 | -30 | 0.972 19 1 | 123.46582 | 123 |
| 21 | 0.1209375 | 9.20339 | 103.543439 | -0.27378 | -34.77704 | -35 | 0.96179 1 | 122.1475 | 122 |
| 22 | 0.1269844 | 9.4 124 | 105.88895 | -0.3 1426 | -39.9 11 | -40 | 0.949337 | 120.56658 | 12 1 |
| 23 | 0.13303 13 | 9.62828 1 | 108.316 16 | -0.358 14 | -45.48832 | -45 | 0.933567 | 118.5766 | 119 |
| 24 | 0.1390781 | 9.86654 | 110.98585 | -0.4311 | -54.74499 | -55 | 0.90230 3 | 114.5925 | 115 |
| 25 | 0.145 1 125 | 10.27 | 115.537 5 | -0.57 1 147 | -72.5762 | -73 | 0.9023 26 | 104.2 1353 | 104 |
| 26 | 0.15 1 17 19 | 11.098 | 124.852 5 | -0.80403 | -102.111 | -102 | 0.820626 | 104.2 1353 | 104 |
| 27 | 0.1572 188 | 12.757 | 143.5 163 | -0.93771 | -1 19.09 | -1 19 | 0.594595 | 75.5 13 53 | 76 |
| 28 | 0.1632656 | 14.193 | 159.67 1788 | -0.978822 | -124.233 | -124 | 0.347406 | 44.12059 | 44 |
| 29 | 0.169 3 125 | 14.935 | 168.0 18 8 | -0.99309 | -126.123 | -126 | 0.207592 | 26.364 13 | 26 |
| 30 | 0.175 3594 | 15.40 1 | 173.26 13 | -0.99899 | -126.872 | -126 | 0.1 17342 | 14.90248 | 15 |
| 31 | 0.18 14063 | 15.77 1 | 177.4238 | -0.99989 | -126.872 | -127 | 0.044949 | 5.708504 | 6 |
| 32 | 0.1874531 | 16.063 | 180.7088 | -0.99992 | -126.99 | -127 | -0.01237 | -1.57096 | -2 |
|  | 0.193 5 |  |  |  |  |  |  |  |  |

FIG. 10

| Step | Distance (Theory) | Corrected Step | Electrical Angle θ | A·cosθ | 8-bit | bit(cos) | B·sinθ | 8-bit | bit(sin) |
|---|---|---|---|---|---|---|---|---|---|
| 33 | 0.199954699 | 16.299 | 183.3638 | -0.998826 | -126.781 | -127 | -0.058867 | -7.4517 | -7 |
| 34 | 0.205559388 | 16.503 | 185.65888 | -0.995513 | -126.381 | -126 | -0.099886 | -12.5226 | -13 |
| 35 | 0.211164066 | 16.711 | 187.99988 | -0.999027 | -125.764 | -126 | -0.139815 | -17.6722 | -18 |
| 36 | 0.217768875 | 16.946 | 190.64425 | -0.998288 | -124.815 | -125 | -0.184688 | -23.4544 | -23 |
| 37 | 0.223773443 | 17.214 | 193.65775 | -0.971724 | -123.409 | -123 | -0.236124 | -29.9869 | -30 |
| 38 | 0.229978133 | 17.512 | 197.01 | -0.956625 | -121.444 | -121 | -0.292548 | -37.1524 | -37 |
| 39 | 0.235828281 | 17.861 | 200.93883 | -0.933988 | -118.615 | -119 | -0.357338 | -45.3808 | -45 |
| 40 | 0.241187875 | 18.317 | 206.06663 | -0.898829 | -114.082 | -114 | -0.439417 | -55.8051 | -56 |
| 41 | 0.247792139 | 19.027 | 214.05398 | -0.828551 | -105.221 | -105 | -0.559962 | -71.1162 | -71 |
| 42 | 0.253396688 | 20.332 | 228.73538 | -0.659954 | -83.76199 | -84 | -0.751617 | -95.4617 | -95 |
| 43 | 0.260001566 | 22.074 | 248.33258 | -0.369225 | -46.89909 | -47 | -0.929264 | -118.026 | -118 |
| 44 | 0.266606259 | 22.916 | 257.80538 | -0.211244 | -26.82746 | -27 | -0.977434 | -124.134 | -124 |
| 45 | 0.272210944 | 23.387 | 263.103375 | -0.120073 | -15.24991 | -15 | -0.992777 | -126.081 | -126 |
| 46 | 0.277815638 | 23.765 | 267.35663 | -0.046137 | -5.857996 | -6 | -0.998947 | -126.865 | -127 |
| 47 | 0.284420319 | 24.042 | 270.47253 | 0.008247 | 1.047325 | 1 | -0.999966 | -126.996 | -127 |
| 48 | 0.290025009 | 24.243 | 272.73338 | 0.047695 | 6.057253 | 6 | -0.998859 | -126.855 | -127 |
| 49 | 0.296629694 | 24.421 | 274.73663 | 0.082569 | 10.486628 | 10 | -0.996598 | -126.566 | -127 |
| 50 | 0.302342438 | 24.6 | 276.75 | 0.117537 | 14.927726 | 15 | -0.993072 | -126.12 | -126 |
| 51 | 0.305383906 | 24.786 | 278.84425 | 0.153719 | 19.522223 | 20 | -0.988112 | -125.491 | -125 |
| 52 | 0.308443755 | 24.982 | 281.04775 | 0.191623 | 24.336661 | 24 | -0.981473 | -124.647 | -125 |
| 53 | 0.314204844 | 25.183 | 283.30088 | 0.230198 | 29.239352 | 29 | -0.973114 | -123.589 | -124 |
| 54 | 0.320465313 | 25.387 | 285.60338 | 0.268983 | 34.160663 | 34 | -0.963148 | -122.319 | -122 |
| 55 | 0.326625781 | 25.593 | 287.92175 | 0.307771 | 39.079912 | 39 | -0.951437 | -120.838 | -121 |
| 56 | 0.333886625 | 25.812 | 290.23265 | 0.348327 | 44.237749 | 44 | -0.937377 | -119.048 | -119 |
| 57 | 0.340446719 | 26.154 | 294.23225 | 0.410447 | 52.125593 | 52 | -0.911896 | -115.811 | -116 |
| 58 | 0.345071880 | 26.466 | 303.36775 | 0.550076 | 69.850091 | 70 | -0.835156 | -106.065 | -106 |
| 59 | 0.356676569 | 26.966 | 318.07713 | 0.743976 | 94.4853 | 94 | -0.668216 | -84.86621 | -85 |
| 60 | 0.362281250 | 28.273 | 337.98338 | 0.927078 | 117.73889 | 118 | -0.374874 | -47.60844 | -48 |
| 61 | 0.366288594 | 30.043 | 346.61225 | 0.972826 | 123.5497 | 124 | -0.231544 | -29.4058 | -29 |
| 62 | 0.374749063 | 30.81291 | 352.02338 | 0.990326 | 125.77148 | 126 | -0.138764 | -17.6228 | -18 |
| 63 | 0.380095313 | 31.675 | 356.34438 | 0.997965 | 126.7415 | 127 | -0.063775 | -8.098882 | -8 |
| 64 | 0.387 | 32 | 360 | 1 | 127 | 127 | 9.28E-08 | 1.18E-05 | 0 |

F I G. 13
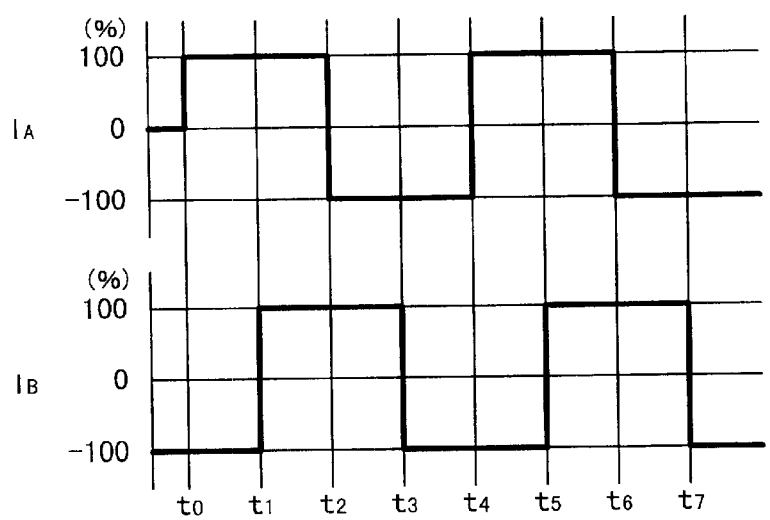
F I G. 14
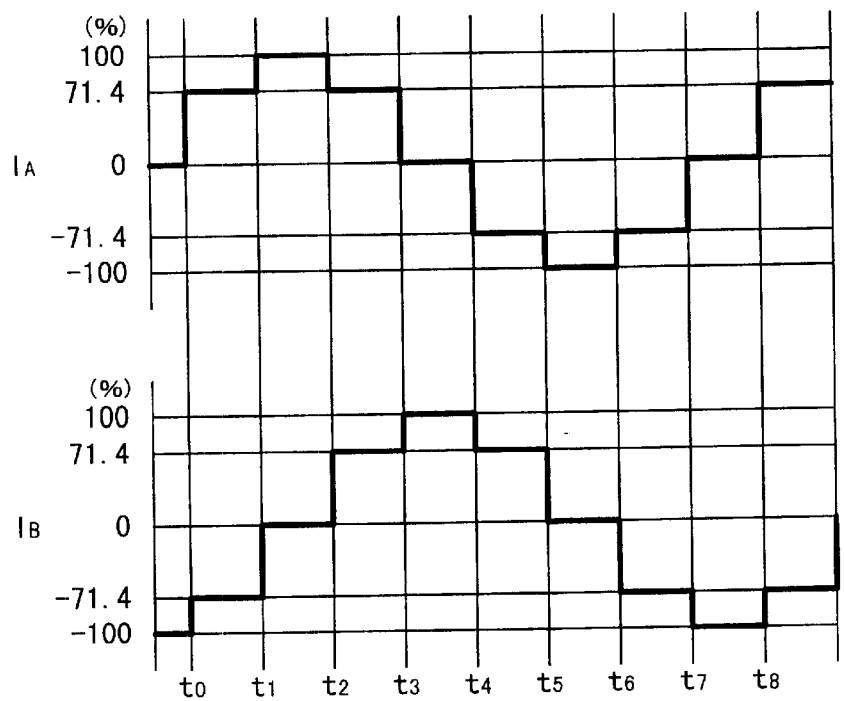

F I G. 18
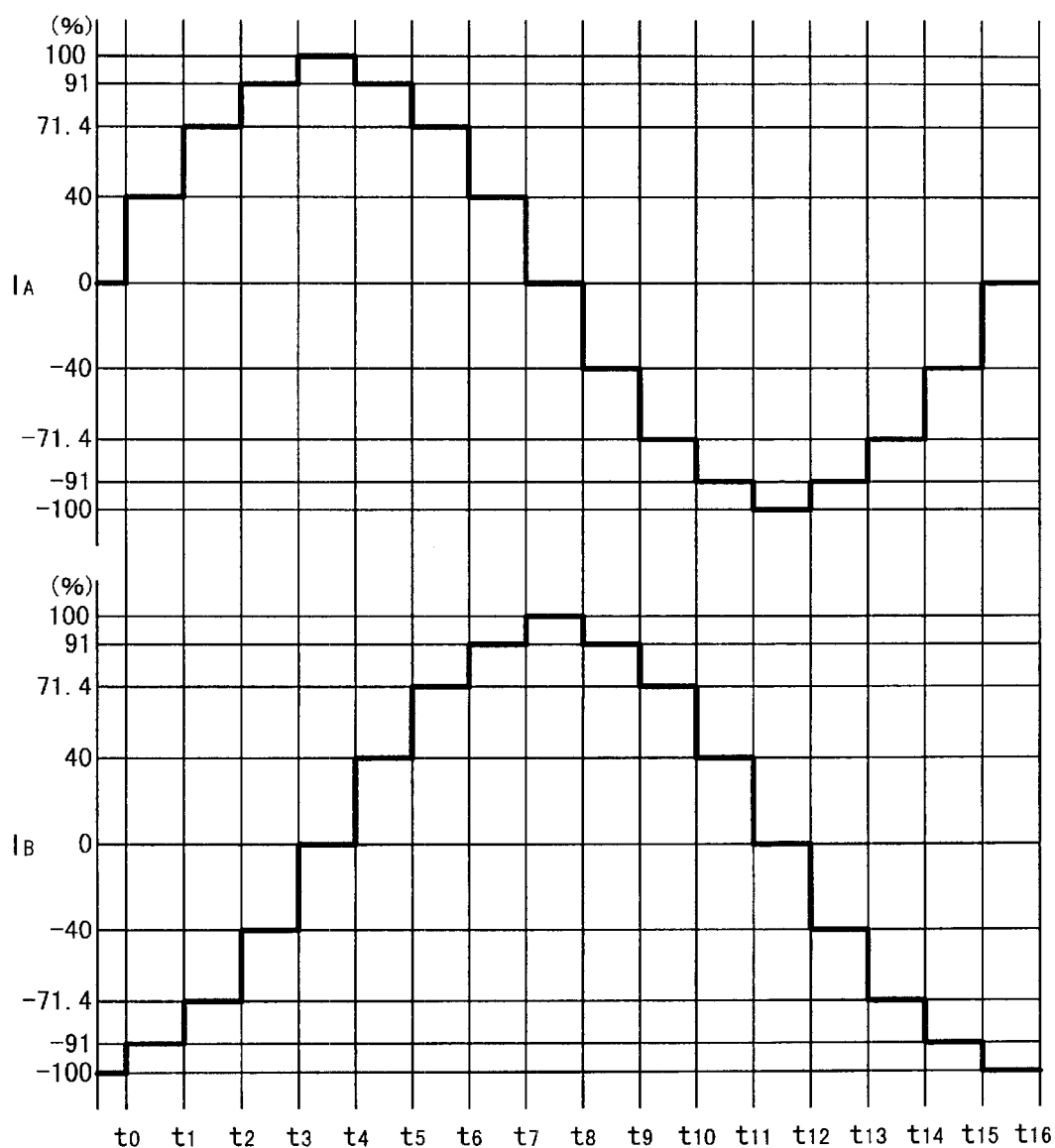

OPTICAL DISK APPARATUS CAPABLE OF CORRECTING THE DRIVE CURRENT WAVEFORMS OF STEPPING MOTOR

BACKGROUND OF THE INVENTION

1. Field of the Invention

The present invention relates to an optical disk driving apparatus, an optical disk driving method, and an optical disk apparatus. The present invention can be applied to a slide-feed control that is performed when information is recorded, for example, in an optical disk (MO), a compact disk (CD), a direct read after write optical disk (CD-R), or a digital video disk (DVD) or reproduced from it.

2. Description of the Related Art

In the field of recent optical disks, in addition to conventional formats of disks, there are various formats of optical disks such as a direct read after write optical disk (CD-R) having a pigment film coated thereon of organic pigment system, a magnetic disk (MO), a change-of-phase optical disk (DVD-RAM), etc.

In recording and reproducing apparatuses for use on these optical disks, there has been performed a slide-feed (also called "sled") control that controls the position of an optical spot radiated from an optical pick-up on each track in the radial direction of the rotation surface of the optical disk. With an increase in the recording density, there has been an increasing demand for ensuring the reliability by performing precise control of the radial position of the optical disk.

In conventional recording and reproducing apparatuses of an optical disk, there has been performed slide feed of the optical pick-up by using a DC motor. For this reason, in order to perform high-speed access, a speed sensor or a position detecting sensor was needed.

In the above-described conventional recording and reproducing apparatuses of an optical disk, control became complex due to the addition of the sensors and the use of a special motor driver for control and therefore the cost became high. Furthermore, there was the inconvenience that a relevant mechanism part became complex and large in size due to the use of gears for adding a relevant mechanism as well as the addition of the sensors.

Also, while it is considered more reasonable to use micro-step driving of the stepping motor, instead of a DC motor, this necessitates the use of a single-purpose driver IC. Therefore, the cost is increased. In addition, variations occur in the driven distance due to the rotation of the motor in units of a step. Therefore, there was the inconvenience that the linearity of the rotation deteriorated.

SUMMARY OF THE INVENTION

The present invention has been made in view of the above-described respects, and an object of the present invention is to propose an optical disk driving apparatus, an optical disk driving method, and an optical disk apparatus that can each enhance the linearity of the rotation of the motor with a simple construction.

To attain the above object, the present invention provides an optical disk driving apparatus having a slide-feed drive portion that, in order to record information into an optical disk and reproduce information therefrom by radiating an optical spot onto the optical disk by an optical pick-up, causes a change of the incident position of the optical spot radiated from the optical pick-up with respect to a rotation surface of the optical disk, the slide-feed drive portion using a stepping motor as drive means for changing the position of the optical pick-up with respect to the rotation surface of the optical disk, and comprising waveform correcting means for correcting drive current waveforms for driving the stepping motor.

Also, the present invention provides an optical disk driving method performing slide-feed driving that, in order to record information into an optical disk and reproduce information therefrom by radiating an optical spot onto the optical disk by an optical pick-up, causes a change of the incident position of the optical spot radiated from the optical pick-up with respect to a rotation surface of the optical disk, the slide-feed driving comprising correcting drive current waveforms for driving the stepping motor to thereby generate correction drive current waveforms, using the stepping motor when there is performed a drive for changing the position of the optical pick-up with respect to the rotation surface of the optical disk, and driving the stepping motor with the use of the correction drive current waveforms.

Also, the present invention provides an optical disk apparatus having a slide-feed drive portion that, in order to record information into an optical disk and reproduce information therefrom by radiating an optical spot onto the optical disk by an optical pick-up, causes a change of the incident position of the optical spot radiated from the optical pick-up with respect to a rotation surface of the optical disk, the slide-feed drive portion using a stepping motor as drive means for changing the position of the optical pick-up with respect to the rotation surface of the optical disk, and comprising waveform correcting means for correcting drive current waveforms for driving the stepping motor.

The optical disk driving apparatus, optical disk driving method, and optical disk apparatus of the present invention perform the following functions.

A laser beam is radiated from the optical pick-up of optical system onto the optical disk that is rotated by the spindle motor that is servo controlled by a spindle servo-system. After the focus servo that is controlled by the focus servo-system is turned to "on", a drive signal from the tracking servo-system of the servo-circuit is amplified by the drive amplifier and this drive signal is applied to the tracking coil of the bi-axial actuator of the optical pick-up of optical system. When the actuator is resultantly being moved in the track-crossing direction, a detection signal is detected from the photo-detector of optical system in response to the light reflected from the optical disk. Also, a drive signal from the focus servo-system is amplified by the drive amplifier and this drive signal is applied to the focus of the bi-axial actuator of the optical pick-up of optical system. When the actuator is resultantly being moved in the focus direction, a detection signal is detected from the photo-detector of optical system in response to the light reflected from the optical disk.

The tracking error signal is amplified by the drive amplifier, and this signal is made to be a tracking actuator drive signal, which is applied to the tracking coil of the bi-axial actuator of the optical pick-up of optical system. Also, the focus error signal is amplified by the drive amplifier, and this signal is made to be a focus actuator drive signal, which is applied to the focus coil of the bi-axial actuator of the optical pick-up of optical system.

It is to be noted that, in the optical pick-up of optical system, the objective lens is independently moved in the focus direction or in the tracking direction through the operation of the bi-axial actuator using an electromagnetic force.

Especially, by correcting the motor driving waveforms by the waveform correcting means of the slide-feed motor controller of the slide-feed drive part, the optical pick-up is linearly moved with respect to the rotation of the slide-feed motor using the stepping motor. As a result of this, the optical pick-up of optical system is sequentially linearly moved toward the outer periphery of the optical disk in synchronism with the rotation of the optical disk. As a result of this, the radiation position of a laser beam is linearly displaced toward the outer periphery of the optical disk sequentially.

Also, in the waveform correcting means, the movement distance of the optical pick-up is divided into equal parts at prescribed intervals to thereby make the drive steps of the stepping motor further fine and thereby determine correction steps; armature angles are determined from these correction steps; excitation current waveforms based on the armature angles are determined; data of prescribed bits is determined from the use thereof to thereby determine correction tables; and correction drive current waveforms corresponding to the drive steps are determined based on these correction tables.

The RF amplifier of the reproduction signal processing circuit generates a reproduction RF signal from the light reflected from the optical disk. The reproduction RF signal is demodulation processed in the reproduction signal processing circuit, is subjected to detection of the error correction codes and then to error correction processing, and then is amplified up to a level that is able to be output and thus output.

BRIEF DESCRIPTION OF THE DRAWINGS

FIG. 9 is a view illustrating a correction table according to the embodiment;

FIG. 10 a view illustrating a correction table according to the embodiment;

FIG. 13 is a view illustrating current patterns of a 2-phase-excitation according to the embodiment;

FIG. 14 is a view illustrating current patterns of a 1-2-phase excitation according to the embodiment;

FIG. 18 is a view illustrating current patterns of a W1-2-phase excitation according to the embodiment;

DETAILED DESCRIPTION OF THE PREFERRED EMBODIMENT

An optical disk apparatus according to an embodiment of the present invention will now be described in detail with suitable reference to the drawings.

[Explanation of the Optical Disk Reproducing Apparatus]

First, an optical disk reproducing apparatus that stands as the premise will hereafter be explained.

Figure 1:
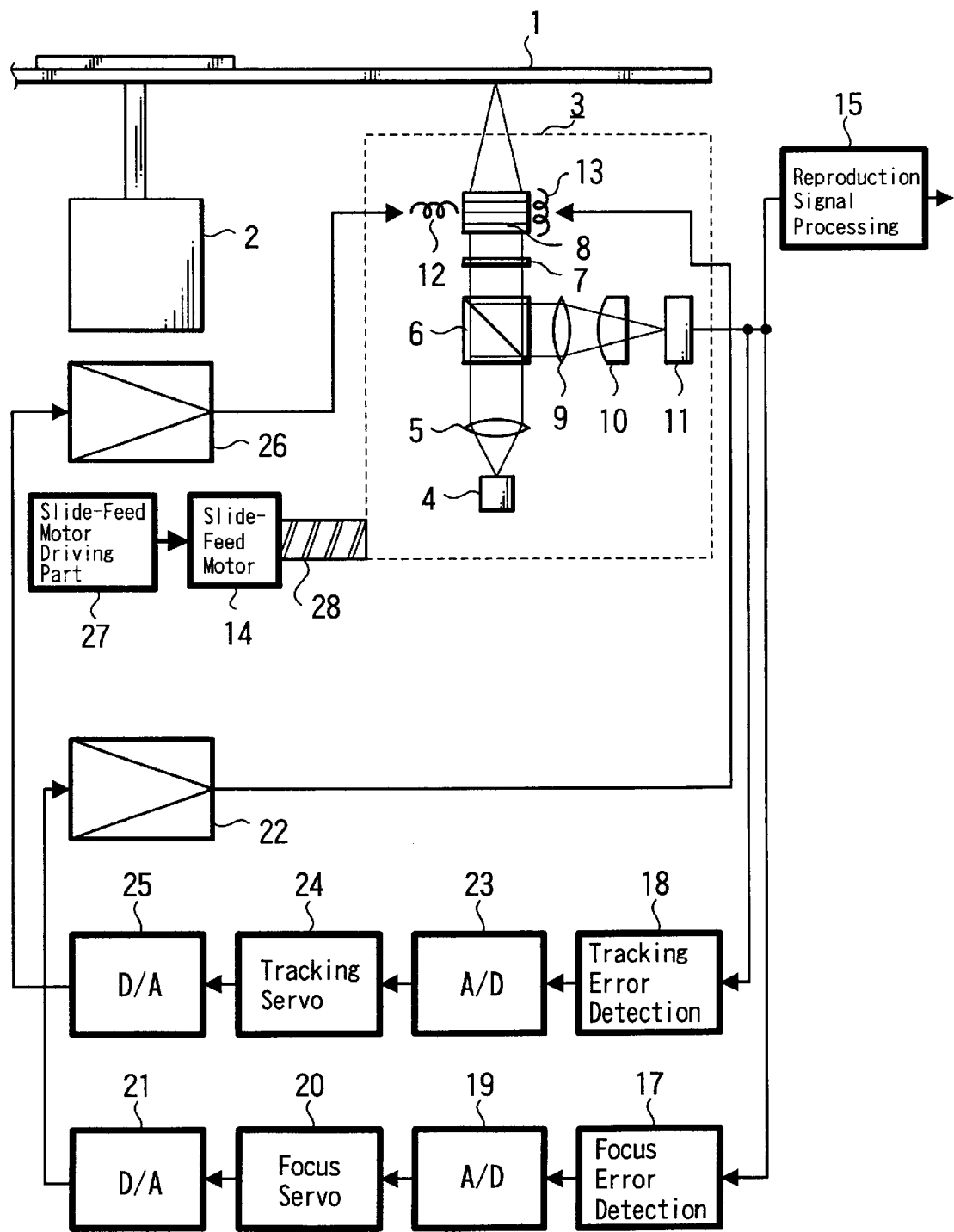
FIG. 1 is a block diagram illustrating the construction of an optical disk reproducing apparatus according to an embodiment of the present invention.

FIG. 1 is a block diagram illustrating the construction of an optical disk reproducing apparatus according to an embodiment of the present invention.

An optical pick-up 3 is equipped with an optical system device that radiates a laser beam onto an optical disk 1 and simultaneously detects a light reflected from the optical disk.

Namely, the optical pick-up 3 has a laser diode 4 disposed therein, from which a laser beam is radiated. This laser beam is arrayed into parallel light ray by a collimator lens 5 and passes through a beam splitter 6. Then it passes through a ½-wavelength plate 7 and an objective lens 8 and is thereby radiated onto a signal recording surface of the optical disk 1.

Also, the light reflected from the optical disk 1 is reflected by the beam splitter 6 via the objective lens 8 and the ½-wavelength plate 7. Then this light is received by a photo-detector 11 via a condenser lens 9 and a cylindrical lens 10.

Here, the objective lens 8 is supported by a bi-axial actuator and is thereby movable in both the tracking direction and the focus direction. Namely, in correspondence with the current that is applied to a tracking coil 12 of the bi-axial actuator, the objective lens 8 is driven in the tracking direction. Also, in correspondence with the current that is applied to a focus coil 13, the objective lens 8 is driven in the focus direction.

Also, the optical pick-up 3 as a whole is movable in the tracking direction by a slide-feed motor 14. It is to be noted that a stepping motor is used as the slide-feed motor 14.

An optical pick-up unit having the optical pick-up 3 has fitted therein a bearing member provided on a feed shaft 28, and the optical pick-up unit is supported rotatably with respect to the feed shaft 28. The feed shaft 28 is made to be as a rotating shaft of the slide-feed motor 14, and its outer-peripheral surface has a spiral thread groove formed thereon. The feed shaft 28 itself constitutes a part of the rotor of the slide-feed motor 14.

The optical pick-up unit that is movably supported by this feed shaft 28 is movable toward or away from a turn table. This optical pick-up unit has the optical pick-up 3 loaded thereon. A head feeding mechanism for moving the optical pick-up unit is constituted by the feed shaft 28 and the slide-feed shaft 14.

An optical head of the optical pick-up unit has a bi-axial actuator that can independently move the objective lens in the focus direction (vertical direction) and the tracking direction (axial direction). An electro-magnetic force is solely used as the drive force for driving this bi-axial actuator. For example, in this embodiment, as this bi-axial actuator, there is adopted a leaf spring type of bi-axial actuator, if it is classified according to the difference in terms of the movable-part supporting method. However, as the bi-axial actuator, it is of course possible to arbitrarily apply other types of bi-axial actuators such as a wire support type, a hinge type, an axial-slide type, etc.

Also, the photo-detector 11 is constructed of a 4-piece photo-diode for detecting a focus error signal, and a 2-piece photo-diode for detecting a tracking error signal. It is to be noted that one pair of photo-diodes of the 4-piece photo-diode are disposed in a direction crossing the track of the optical disk and the other pair of photo-diodes are disposed in the direction crossing the track of the optical disk. Also, Two-piece photo-diode is disposed with an offset in the direction crossing the track of the optical disk.

The light reflected from the optical disk 1 is diffracted by a diffraction grating not illustrated or by the optical disk 1. Therefore, the light spot that is received by the photo-detector 11 becomes three light spots, a first one of which is a main beam as the 0th order light, and the remaining two of which respectively are sub-beams as the (+) 1st order diffraction light and (−) 1st order diffraction light that are located in the track-crossing direction with the 0th order main beam being located therebetween.

The 0th order main beam is received by the 4-piece photo-diode. The (+) 1st order sub-beam diffraction light and (−) 1st order sub-beam diffraction light are received by the 2-piece photo-diode.

An addition signal (A+B+C+D) of the output signals from the 4-piece photo-diode of the photo-detector 11 is supplied to a reproduction signal processing circuit 15.

The output signal of the 4-piece photo-diode of the photo-detector 11 is supplied to a focus error detection circuit 17. By the focus error detection circuit 17, a difference signal between a pair of addition signals (A+C) in one diagonal direction of the 4-piece photo-diode and the other pair of addition signals (B+D) in the other diagonal direction thereof is detected as {(A+C)−(B+D)}. This difference signal {(A+C)−(B+D)} between the addition signal (A+C) and the addition signal (B+D) is made to be a focus error signal.

Namely, at a focus-achieved position, the reflected beam that comes on via the cylindrical lens 10 becomes circular, and at a focus-missed position, that is displaced from the focus-achieved position, becomes elliptic. Accordingly, from the difference signal between the addition output signal (A+C) and the addition output signal (B+D) of the 4-piece photo-diode that detects the elliptic beam there is obtained a focus error signal.

Also, the output signals of the 2-piece photo-diode of the photo-detector 11 are supplied to a tracking error detection circuit 18. In the tracking error detection circuit 18, a difference signal (E−F) between the output signal E and the output signal F of the 2-piece photo-diode is made to be a tracking error signal.

Also, the focus error signal that is output from the focus error detection circuit 17 is digitized by an A/D converter 19 and this focus error signal is supplied to a focus servo circuit 20. The output signal of the focus servo circuit 20 is supplied to a focus coil 13 as a focus coil driving current via a D/A converter 21 and a drive amplifier 22. As a result of this, the objective lens 8 is moved in the focus direction so that its position may be located at the focus-achieved position.

Also the tracking error signal that is output from the tracking error detection circuit 18 is digitized by an A/D converter 23 and this tracking error signal is supplied to a tracking servo circuit 24. The output signal of the tracking servo circuit 24 is supplied to a tracking coil 12 as a tracking coil driving current via a D/A converter 25 and a drive amplifier 26. As a result of this, the objective lens 8 is moved in the tracking direction so that the beam spot may trace the track center.

[Explanation of the Slide-Feed Motor Driving Part]

Figure 2:
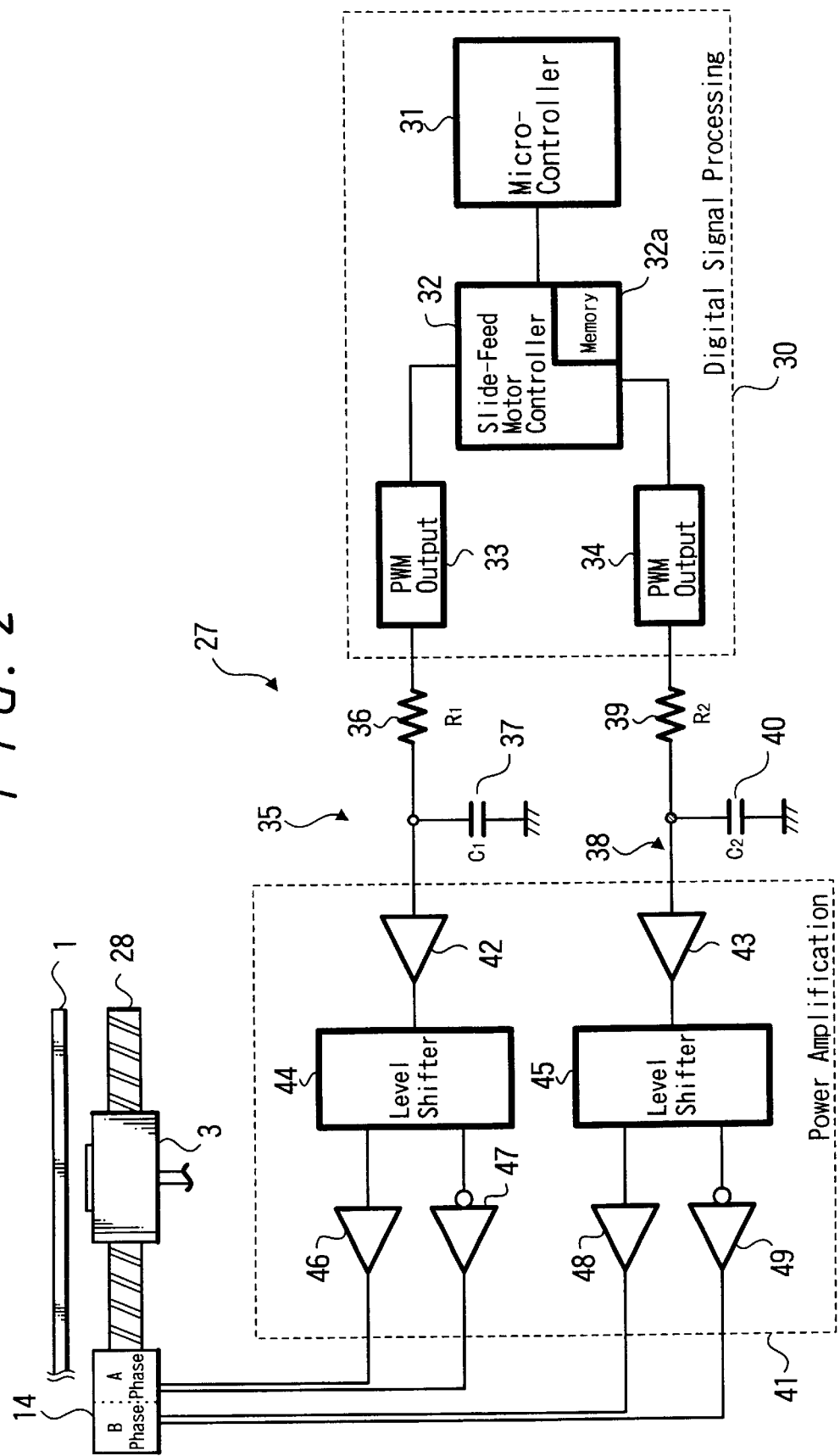
FIG. 2 is a block diagram illustrating the construction of a slide-feed motor driving portion according to the embodiment.

FIG. 2 is a block diagram illustrating the construction of a slide-feed motor driving part according to the embodiment.

In FIG. 2, the slide-feed motor driving portion according to the present embodiment is constructed of the optical pick-up 3 that radiates a light beam onto the optical disk 1, the slide-feed motor 14 that moves the optical pick-up 3 in the radial direction of the optical disk by using the feed shaft 28, a digital signal processing circuit 30 that supplies a control signal to the slide-feed motor 14, LPFs 35 and 38 that make the control signal from the digital signal processing circuit 30 linear signals, and a power amplifier circuit 41 that amplifies the power levels of the linear control signals from the LPFs 35 and 38. It is to be noted that a stepping motor is used as the slide-feed motor 14.

Also, the digital signal processing circuit 30 is constructed of a micro-controller 31 that outputs a command signal concerned with the operation performed of the slide-feed motor 14, a slide-feed motor controller 32 that outputs the voltage value data for use on A phase and B phase according to the command signal from the micro-controller 31 by the number of steps that is indicated by the command, and PWM outputs 33 and 34 that output the voltage values for use on A phase and B phase from the slide-feed motor controller 32 in accordance with the PWM (pulse width modulation) method.

Here, the digital signal processing circuit 30 is wholly or partly constructed of a DSP (digital signal processor). In this case, the micro-controller 31 and the slide-feed controller 32 may each be constructed of a software application.

Also, in the interior of the slide-feed motor controller 32, there is contained a memory 32a in which prescribed information can be stored.

It is to be noted here that the micro-controller 31 and the slide-feed motor controller 32 constitute waveform correcting means for correcting a drive current waveform for driving the motor so that the driven distance resulting from the rotation of the motor made per step may become linear.

Also, the LPF 35 has a resistor 36 and a capacitor 37. The LPF 38 has a resistor 39 and a capacitor 40.

Also, the power amplifier circuit 41 is constructed of an amplifier 42 that amplifies the power level of the linear control signal, a level shifter circuit 44 that shifts the center of the amplitude of the thus-amplified linear control signal to a center potential, an amplifier 46 that amplifies the control signal output from one output terminal of the level shifter circuit 44 and that supplies the thus-amplified signal to one end of the A-phase coil of the slide-feed motor 14 as a for-A-phase slide-feed motor driving current, and an inverter 47 that inverts and amplifies the control signal output from the other output terminal of the level shifter circuit 44 and that supplies the thus-inverted and amplified signal to the other end of the A-phase coil of the slide-feed motor 14 as a for-A-phase-inversion slide-feed motor driving current.

Also, the power amplifier circuit 41 is constructed of an amplifier 43 that amplifies the power level of the linear control signal, a level shifter circuit 45 that shifts the center of the amplitude of the thus-amplified linear control signal to the middle-point potential, an amplifier 48 that amplifies the control signal output from one output terminal of the level shifter circuit 45 and that supplies the thus-amplified signal to one end of the B-phase coil of the slide-feed motor 14 as a for-B-phase slide-feed motor driving current, and an inverter 49 that inverts and amplifies the control signal output from the other output terminal of the level shifter circuit 45 and that supplies the thus-inverted and amplified signal to the other end of the B-phase coil of the slide-feed motor 14 as a for-B-phase-inversion slide-feed motor driving current.

The operation of the slide-feed motor drive control system of the above-described optical disk reproducing apparatus will hereafter be explained.

In FIG. 2, from the micro-controller 31, a command signal indicating how many steps the slide-feed motor 14 should be rotated is supplied to the slide-feed motor controller 32. As described previously, within the slide-feed motor controller 32 there is contained the memory 32a. As the prescribed information is previously stored an amount of the voltage value data that is (corresponding to 64 steps in a set form) and is to be supplied to each of the A phase and B phase in micro step driving (e.g., 4W1-2-phase excitation).

Incidentally, the data that has been stored in the memory 32a is a correction drive current waveform that has been corrected by the waveform correcting means so that the optical pick-up 3 may be linearly moved with respect to the rotation of the slide-feed motor as later described.

The slide-feed motor controller 32 supplies the voltage value data, that is to be supplied to the A phase and B phase, to the PWM outputs 33 and 34 sequentially by the number of steps that has been designated by the command signal. The PWM outputs 33 and 34 have their voltage value data modulated in accordance with the PWM method and output the thus-modulated signals as the control signals for use on the A phase and B phase.

The control signals for use on the A phase and B phase are supplied to the LPFs 35 and 38. The LPFs 35 and 38 convert the control signals for use on the A phase and B phase under the PWM method to linear signals each corresponding to D.C. level. The control signals for use on the A phase and B phase that have been thus converted to linear signals are supplied to the amplifiers 42 and 43 of the power amplifier circuit 41.

The amplifier 42 amplifies the power level of the linear control signal for use on the A phase and supplies the resulting signal to the level shifter circuit 44. The level shifter circuit 44 shifts the center of the amplitude of the amplified linear control signal to the middle-point potential, and supplies the resulting control signal to the amplifier 46 from one output terminal thereof. And the level shifter circuit 44 supplies this control signal to the inverter 47 from the other output terminal thereof.

The amplifier 46 amplifies the control signal output thereto from the one terminal of the level shifter circuit 44, and supplies the thus-amplified signal to one end of the A phase coil of the slide-feed motor 14 as a A-phase slide-feed motor driving current. The inverter 47 inverts and amplifies the control signal output thereto from the other output terminal of the level shifter circuit 44, and supplies the resulting signal to the other end of the A phase coil of the slide-feed motor 14 as a A-phase-inversion slide-feed motor driving current.

Also, the amplifier 43 amplifies the power level of the linear control signal for use on the B phase, and supplies the thus-amplified signal to the level shifter circuit 45. The level shifter circuit 45 shifts the center of the amplitude of the amplified linear control signal to the middle-point potential. Then it supplies the resulting control signal from one output terminal of it to the amplifier 48, and supplies this control signal to the inverter 49 from the other output terminal of it.

The amplifier 48 amplifies the control signal output thereto from the one terminal of the level shifter circuit 45, and supplies the thus-amplified signal to one end of the B phase coil of the slide-feed motor 14 as a B-phase slide-feed motor driving current. The inverter 49 inverts and amplifies the control signal output thereto from the other output terminal of the level shifter circuit 45, and supplies the resulting signal to the other end of the B phase coil of the slide-feed motor 14 as a B-phase-inversion slide-feed motor driving current.

By inputting the control signal whose control signal is power amplified to the A and B phases of the slide-feed motor 14 in the above-described way, rotation is caused of the feed shaft 28 that has been directly connected to the rotating shaft of the slide-feed motor 14 so that the driven distance resulting from the rotation of the motor per step may become linear. By doing so, the optical pick-up 3 equipped with the bearing portion for use on the feed shaft 28 can be radially moved with respect to the optical disk 1.

Based on the command from the above-described micro-controller 31, in the waveform correcting means constituted by the slide-feed motor controller 32, correction is performed of the motor driving waveform. By doing so, it is arranged that the optical pick-up can be linearly moved with respect to the rotation of the slide-feed motor 14. As a result of this, the optical pick-up of this optical system is linearly sequentially moved toward the outer periphery of the optical disk in synchronism with the rotation of the optical disk by the slide-feed (sled) motor 14. As a result of this, the position at which a laser beam is radiated can be linearly displaced sequentially toward the outer periphery of the optical disk.

[Principle of the Operation of the Stepping Motor]

Figure 3:
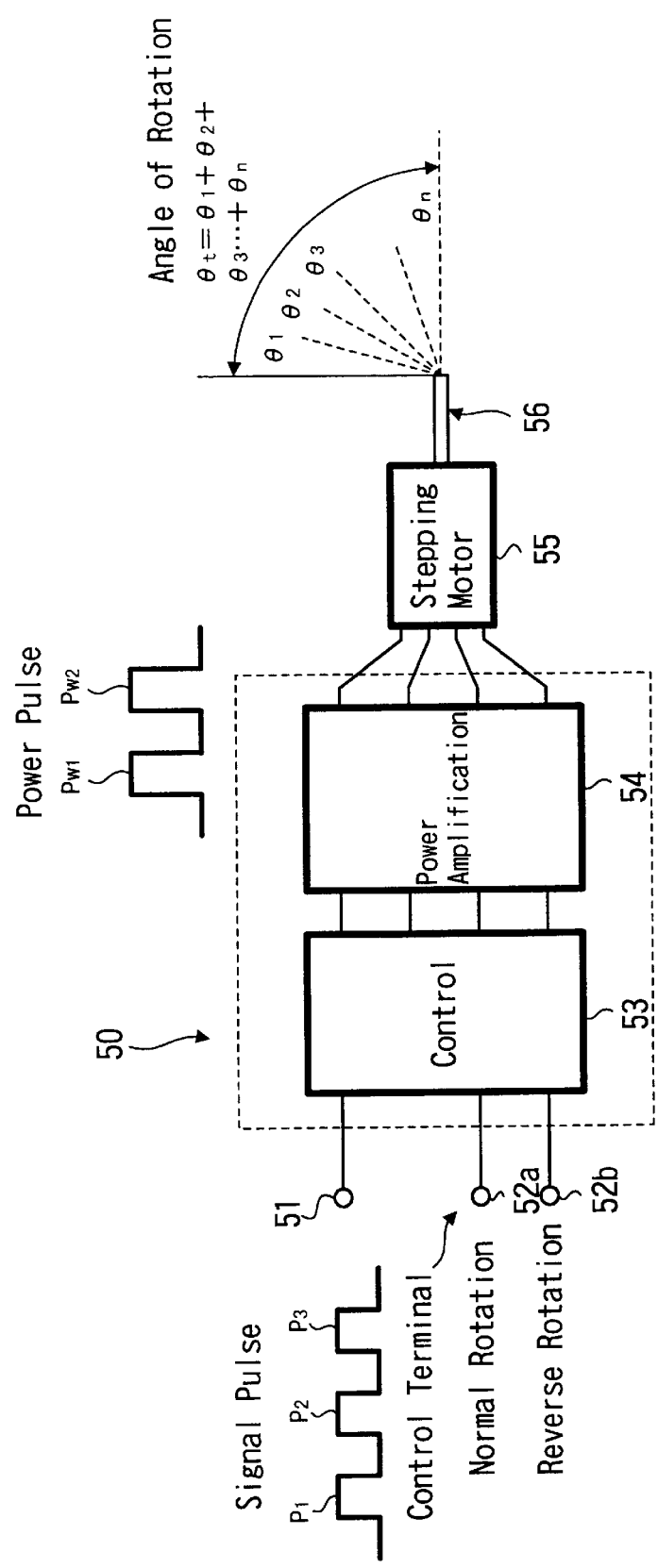
FIG. 3 is a view illustrating the gist of the operation of a stepping motor according to the embodiment.

FIG. 3 is a view illustrating the gist of the operation of a stepping motor according to the present embodiment.

The stepping motor 55 has a circuit characteristic that depends on the pulse waveform power. The angle of rotation of the rotating shaft can be controlled in proportion to the pulse waveform of an input signal, and the speed of rotation can be controlled in proportion to the pulse frequency of the input signal. Therefore, positioning can be controlled by using a digital pulse signal through an "open" control without a feedback system.

Here, by using signal pulses P1, P2, and P3, preparation is made of power pulses PW1 and PW2 through a drive circuit 50. Further, the resulting pulse power is supplied to the stepping motor 55. Also, the angle θ of rotation of the rotating shaft 56 of the stepping motor 55 is changed to θ1 to θn in terms of the rotation each time the power pulse PW1, PW2 is input. Also, the drive circuit 50 does not only amplify the signal pulses P1, P2, P3 in its power amplifier circuit 54. But it also includes the function of controlling the excitation sequence, which constitutes the rotating magnetic field of the stepping motor 55, through controlling control terminals 52a, 52b in its control circuit 53 in terms of the normal or reverse rotation with respect to the signal pulses input from an input terminal 51.

Figures 4, 5:
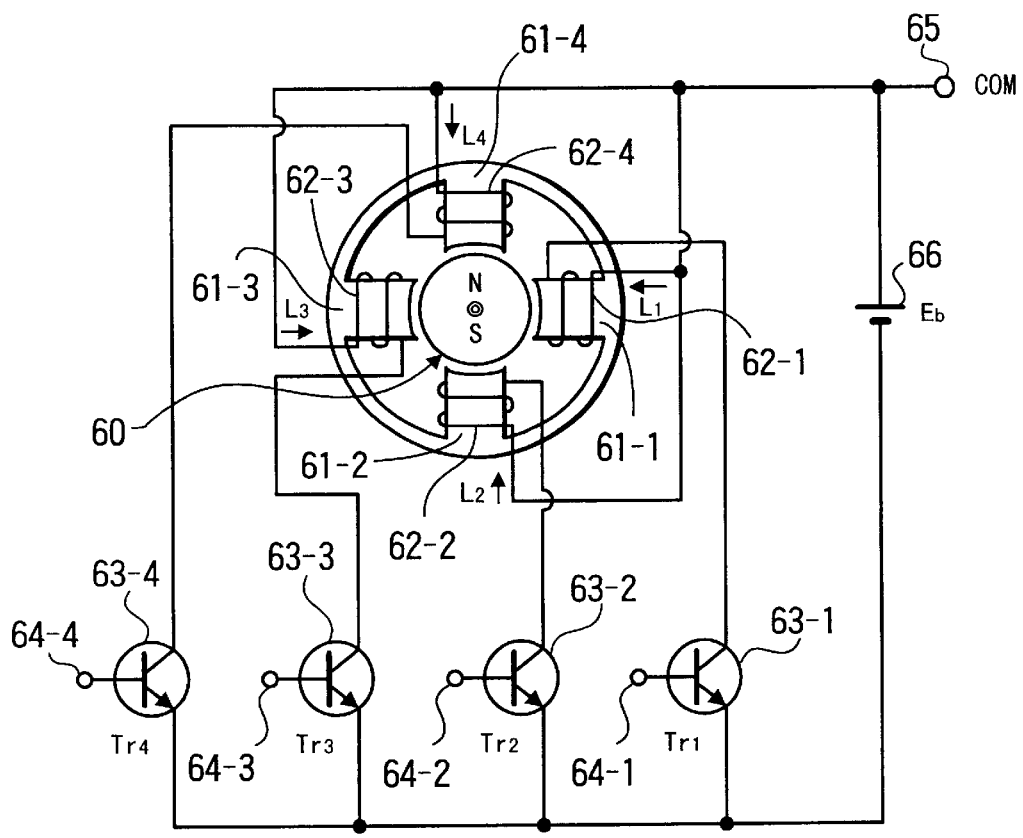
FIG. 4 is a view illustrating the principle of the operation of the stepping motor according to the embodiment.
FIG. 5 is a view illustrating the relationship between the number of steps and the excitation phase according to the embodiment.

FIG. 4 is a view illustrating the principle of the operation of the stepping motor according to the embodiment. Also, FIG. 5 is a view illustrating the relationship between the number of steps and the excitation phase according to the present embodiment.

In FIGS. 4 and 5, first, in step 1, when only a terminal 64-1 goes high in level, a transistor 63-1 (Tr1) is turned on to excite a coil 62-1 (L1). As a result, a current as illustrated in FIG. 4 flows in a coil 62-1 (L1), with the result that an S pole generates in a core 61-1 of a stator (stator) side. When the S pole generates in the core 61-1, the S pole attracts an N pole of a magnet rotor (rotor) 60, with the result that the magnet rotor 60 rotates through 90 degrees.

Next, in step 2, when only a terminal 64-2 goes high, a transistor 63-2 (Tr2) is turned on, with the result that a coil 62-2 (L2) is excited. As a result, a current as illustrated in FIG. 4 flows in a coil 62-2 (L2), with the result that an S pole generates in a core 61-2 of the stator (stator) side. When the S pole generates in the core 61-2, the S pole attracts the N pole of the magnet rotor (rotor) 60, with the result that the magnet rotor 60 further rotates through 90 degrees. As a result, the rotor 60 rotates through 180 degrees when measured from the outset.

Next, in step 3, when only a terminal 64-3 goes high, a transistor 63-3 (Tr3) is turned on, with the result that a coil 62-3 (L3) is excited. As a result, a current as illustrated in FIG. 4 flows in a coil 62-3 (L3), with the result that an S pole generates in a core 61-3 of the stator (stator) side. When the S pole generates in the core 61-3, the S pole attracts the N pole of the magnet rotor (rotor) 60, with the result that the magnet rotor 60 further rotates through 90 degrees. As a result, the rotor 60 rotates through 270 degrees when measured from the outset.

And, in step 4, when only a terminal 64-4 goes high, a transistor 63-4 (Tr4) is turned on, with the result that a coil 62-4 (L4) is excited. As a result, a current as illustrated in FIG. 4 flows in a coil 62-4 (L4), with the result that an S pole generates in a core 61-4 of the stator (stator) side. When the S pole generates in the core 61-4, the S pole attracts the N pole of the magnet rotor (rotor) 60, with the result that the magnet rotor 60 further rotates through 90 degrees. As a result, the rotor 60 rotates through 360 degrees when measured from the outset. Thereafter, in each of step 5 and thereafter-succeeding steps, the same operation as in each of the steps 1 to 4 is repeatedly performed.

Figure 6:
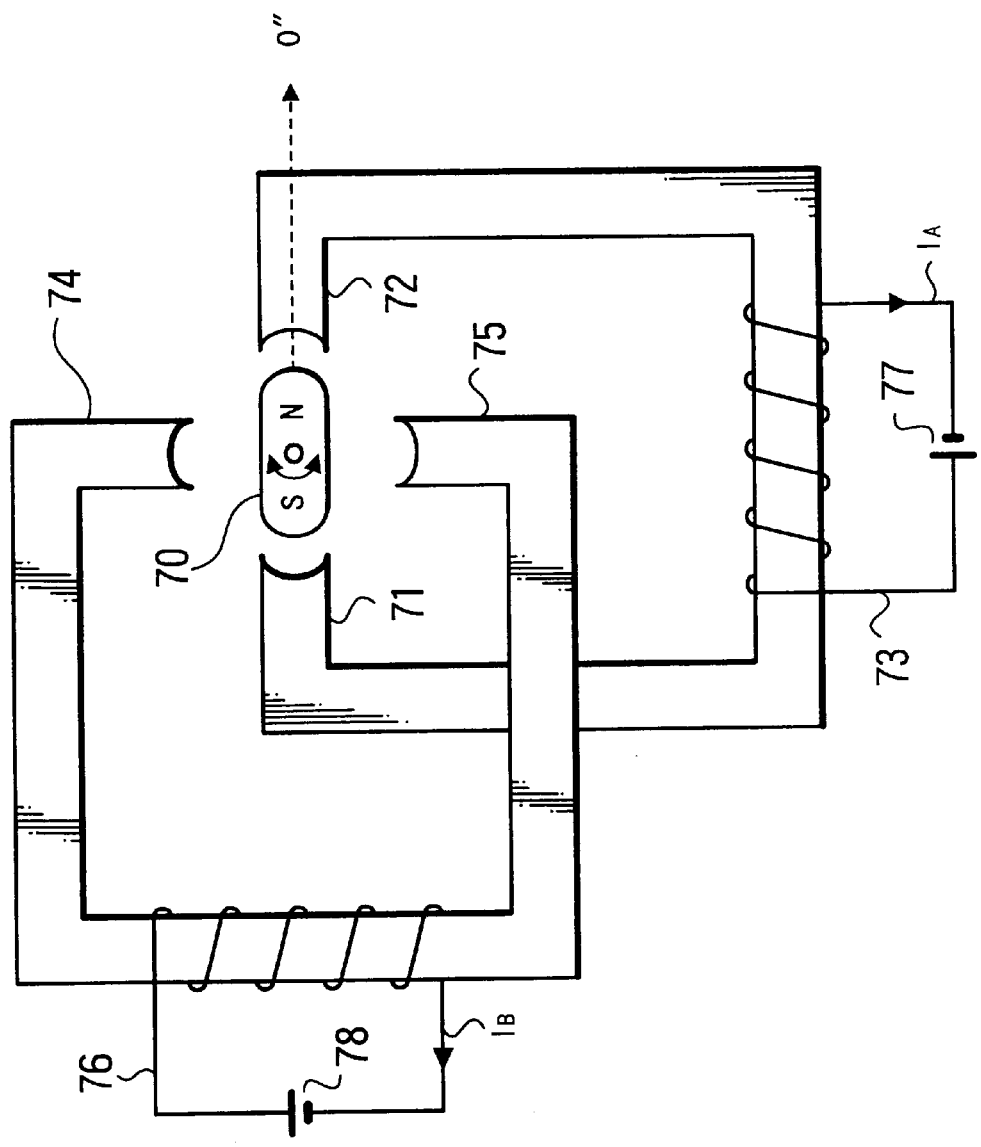
FIG. 6 is a view illustrating a fundamental structure of the stepping motor according to the embodiment.

FIG. 6 is a view illustrating a fundamental structure of the stepping motor according to the present embodiment.

In FIG. 6, when a pair of cores 71 and 72 is opposed to the S pole and N pole of a magnet rotor 70, respectively, by causing a current IA to flow from a power source 77 to excite one coil 73, there is established a positional relationship wherein a current IB does not flow from a power source 78; the other coil 76 is not excited; and the other pair of cores 74 and 75 is not opposed to the S and N poles of the magnet rotor 70. This state is alternately repeated, with the result that the magnet rotor is rotated.

The state of FIG. 6 illustrates the positional relationship wherein the current IA is maximum and the current IB is zero. At this time, the magnetic field that generates from an electromagnet composed of the one coil 73 and the cores 71 and 72 and the magnetic field that generates from an electromagnet composed of the other coil 76 and the cores 74 and 75 intersect each other at a right angle in terms of the rotation phase. Accordingly, if the relationship of that IA=sin θ and IB=cos θ is set as such, the armature angle θ of the rotation phase can be directed in any direction from 0 to 360 degrees, and the intensity of the magnetic field becomes fixed.

However, this is only the case with an ideal state of the stepping motor. Actually, the movement of the magnet rotor (rotor) has an effect upon the magnetic field. Therefore, for example, the intensity of the magnetic field differs between when the rotor is located in correspondence with the cores and when the rotor is located at an intermediate position between the core and the adjacent core. And therefore the direction itself of the magnetic field does not correctly reflect the magnitude of the electric current. In addition, for example, because the direction of the magnetic field differs between when the rotor is located in correspondence with the cores and when the rotor is located at an intermediate position between the core and the adjacent core, nor do the direction of the magnetic field and that of the rotor completely coincide with each other. Therefore, it is known that even when the motor is driven with a sine wave of no distortion, this does not enable the rotation of it with a fixed speed.

[Method of the Micro-Step Driving]

Figure 7:
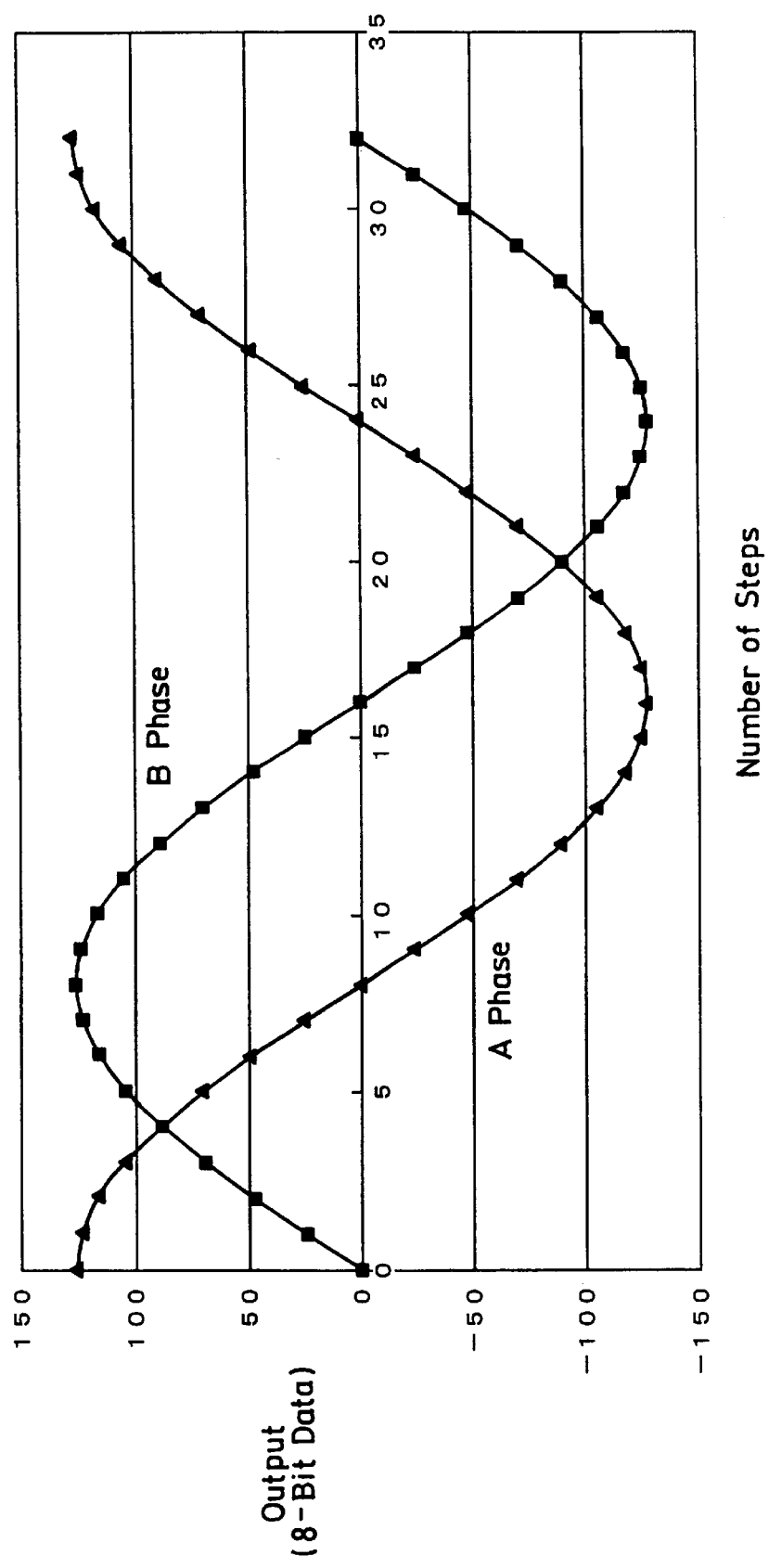
FIG. 7 is a view (2W1-2-phase excitation) illustrating motor driving waveforms (each of which is a sine wave) according to the embodiment.
Figure 20:
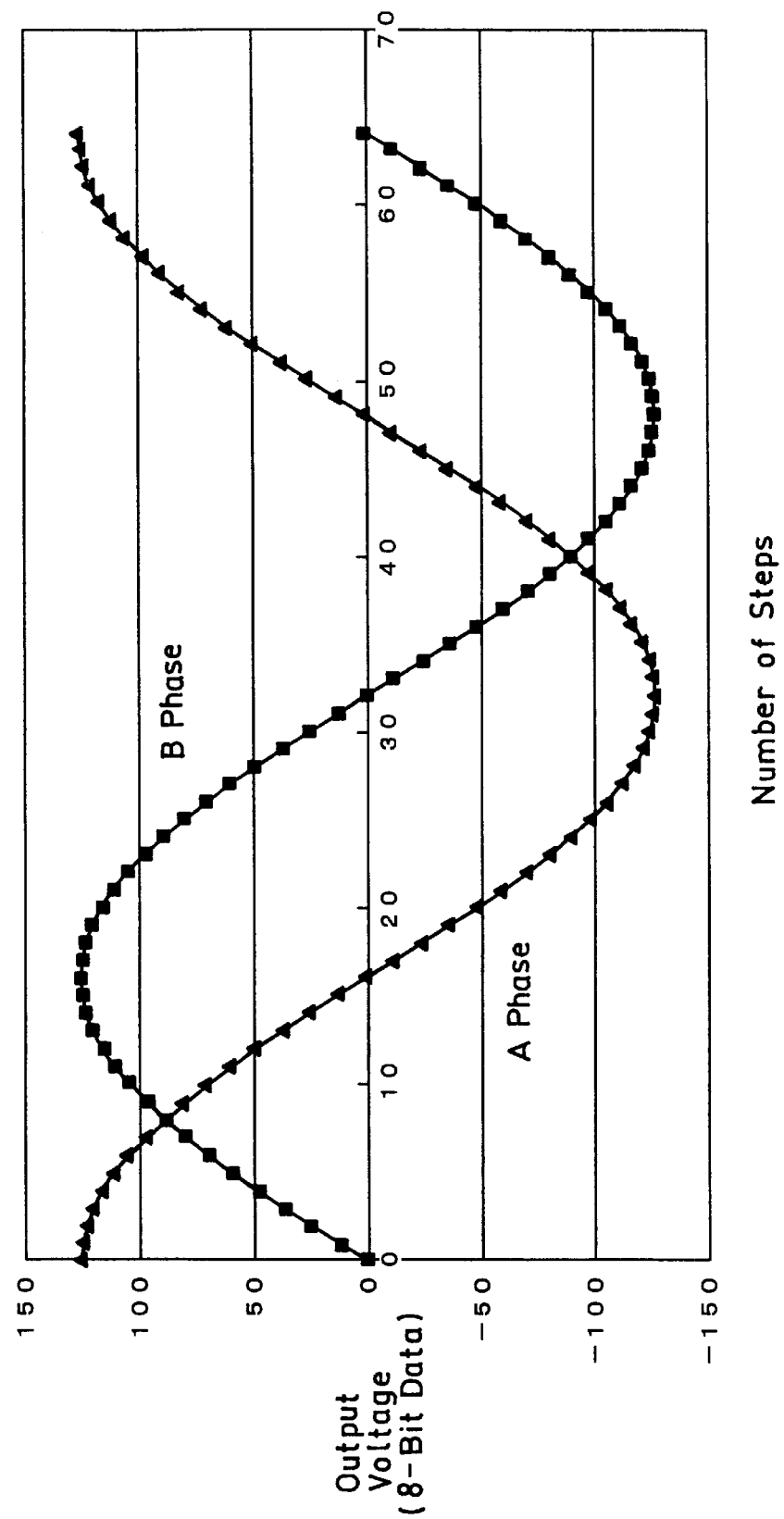
FIG. 20 is a view (4W1-2-phase excitation) illustrating motor driving waveforms (each of which is a sine wave) according to the embodiment.

As the method of driving a stepping motor there are a 2-phase excitation wherein the armature angle θ of each of the IA and the IB is rotated by a step of 90 degrees, a 1-2-phase excitation wherein this armature angle is rotated by 45 degrees, and a W1-2-phase excitation wherein this armature angle is rotated by 22.5 degrees. Further, as the method of micro-step driving that performs a high-precision control of the rotation, there are a 2W1-2-phase excitation wherein the armature angle is rotated by 11.25 degrees and a 4W1-2-phase excitation wherein the armature angle is rotated by 5.62 degrees. Incidentally, FIG. 7 is a view illustrating motor driving waveforms (each of which is a sine wave) of the 2W1-2-phase excitation according to the embodiment. And FIG. 20 is a view illustrating motor driving waveforms (each of which is a sine wave) of the 4W1-2-phase excitation according to the embodiment.

FIG. 13 is a view illustrating current patterns of the 2-phase-excitation according to the present embodiment. In the IA current pattern, the drive current that is to be supplied to the A-phase coil of the motor, at a phase t0, rises from 0 to a maximum value 100%, from the phase t0 to a phase t2 is maintained at the maximum value of 100%, at the phase t2 falls from the maximum value 100% down to −100%, from the phase t2 to a phase t4 is maintained at −100%, and conversely at the phase t4 rises from −100% up to the maximum value 100%. Thereafter, from the phase t4 to a phase t8, from a phase t8 to a phase t12, . . . the drive current repeatedly exhibits the same waveform.

Also, in the IB current pattern, the drive current that is to be supplied to the B-phase coil of the motor has a waveform whose phase is shifted by the phase t1 from the drive current of the A phase.

It is to be noted that the vectors of the magnetic field of the 2-phase excitation make one full rotation with 4 steps from t1 to t4; and the IA and the IB are delayed from each other by the phase t1.

FIG. 14 is a view illustrating current patterns of the 1-2-phase excitation in the motor driving current according to the present embodiment. In the IA current pattern, the drive current that is to be supplied to the A-phase coil of the motor, at a phase to, rises from 0 to 71.4%, from the phase t0 to a phase t1 is maintained at 71.4%, at the phase t1 rises up to a maximum value 100%, from the phase t1 to a phase t2 is maintained at 100%, at the phase t2 conversely falls from the maximum value 100% down to 71.4%, from the phase t2 to a phase t3 is maintained at 71.4%, at the phase t3 falls from 71.4% down to 0, and from the phase t3 to a phase t4 is maintained at 0.

Further, the drive current falls from 0 to −71.4%, from the phase t4 to a phase t5 is maintained at −71.4%, at the phase t5 falls down to a minimum value of −100%, from the phase t5 to a phase t6 is maintained at −100%, at the phase t6 conversely rises from the minimum value of −100% up to −71.4%, from the phase t6 to a phase t7 is maintained at −71.4%, at the phase t7 rises from −71.4% up to 0, and from the phase t7 to a phase t8 is maintained at 0. Thereafter, from the phase t8 to a phase t16, from the phase t16 to a phase t24, from the phase t24 to a phase t32 . . . the drive current repeatedly exhibits the same waveform.

Also, in the IB current pattern, the drive current that is to be supplied to the B-phase coil of the motor has a waveform whose phase is delayed by the phases t2 from the drive current of the A phase.

Figure 15:
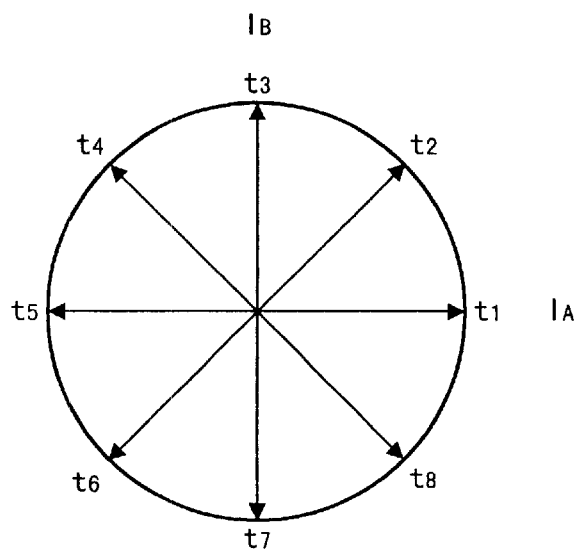
FIG. 15 is a view illustrating the rotation of the magnetic-field vectors of the 1-2-phase excitation according to the embodiment.

FIG. 15 is a view illustrating the rotation of the magnetic-field vectors of the 1-2-phase excitation according to the embodiment. As illustrated in FIG. 15, the magnetic field vectors of the 1-2-phase excitation make one full rotation with 8 steps from t1 to t8, and it is seen that the IA and the IB are shifted from each other by the phases t2.

FIG. 18 is a view illustrating current patterns of the W1-2-phase excitation made using the motor driving current according to the embodiment. In the IA, the drive current that is to be supplied to the A-phase coil of the motor, at a phase t0, rises from 0 to 40%, from the phase t0 to a phase t1 is maintained at 40%, at the phase t1 rises up to 71.4%, from the phase t1 to a phase t2 is maintained at 71.4%, at the phase t2 rises up to 91%, from the phase t2 to a phase t3 is maintained at 91%, at the phase t3 rises up to a maximum value of 100%, from the phase t3 to a phase t4 is maintained at 100%, at the phase t4 conversely falls from the maximum value of 100% down to 91%, from the phase t4 to a phase t5 is maintained at 91%, at the phase t5 falls down to 71.4%, from the phase t5 to a phase t6 is maintained at 71.4%, at the phase t6 falls from 71.4% down to 40%, from the phase t6 to a phase t7 is maintained at 40%, at the phase t7 falls down to 0, and from the phase t7 to a phase t8 is maintained at 0.

Further, at the phase t8, the drive current falls from 0 down to −40%, from the phase t8 to a phase t9 is maintained at −40%, at the phase t9 falls down to −71.4%, from the phase t9 to a phase t10 is maintained at −71.4%, at the phase t10 falls down to −91%, from the phase t10 to a phase t11 is maintained at −91%, at the phase t11 falls down to a minimum value of −100%, from the phase t11 to a phase t12 is maintained at −100%, at the phase t12 conversely rises from the minimum value of −100% up to −91%, from the phase t12 to a phase t13 is maintained at −91%, at the phase t13 rises up to −71.4%, from the phase t13 to a phase t14 is maintained at −71.4%, at the phase t14 rises from −71.4% up to −40%, from the phase t14 to a phase t15 is maintained at −40%, at the phase t15 rises up to 0, and from the phase t15 to a phase t16 is maintained at 0. Thereafter, from the phase t16 to a phase t32, . . . the drive current repeatedly exhibits the same waveform.

Also, in the IB current pattern, the drive current that is to be supplied to the B-phase coil of the motor has a waveform whose phase is delayed by the phases t4 from the drive current of the A phase.

Figure 16:
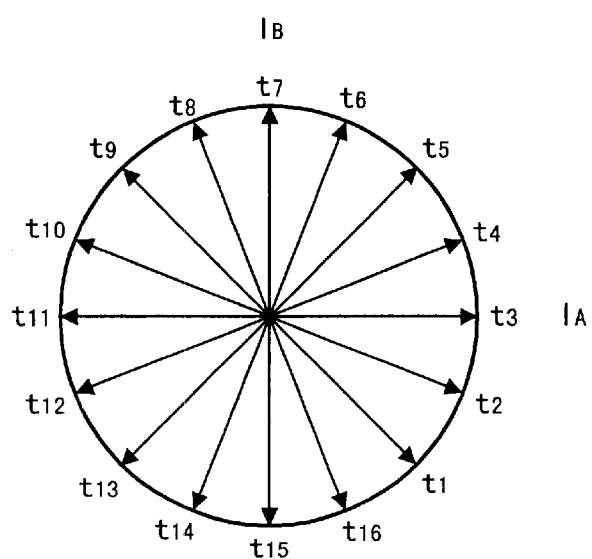
FIG. 16 is a view illustrating the rotation of the magnetic-field vectors of the W1-2-phase excitation according to the embodiment.

FIG. 16 is a view illustrating the rotation of the magnetic-field vectors of the W1-2-phase excitation according to the embodiment. As illustrated in FIG. 16, the magnetic field vectors of the W1-2-phase excitation make their one full rotation with 16 steps from t1 to t16, and it is seen that the IA and the IB are shifted from each other by the phases t4.

Figure 19:
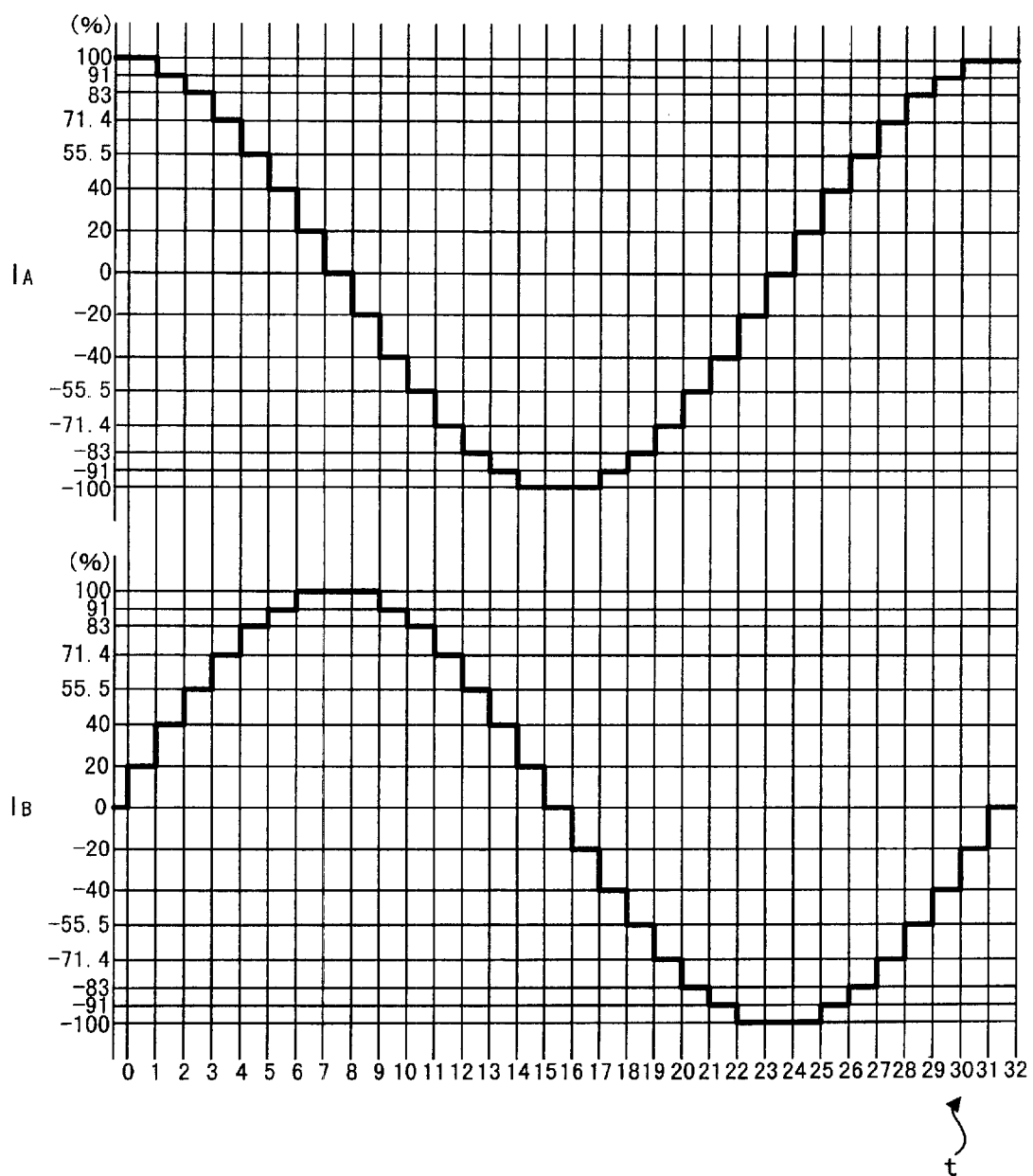
FIG. 19 is a view illustrating current patterns of a 2W1-2-phase excitation according to the embodiment.

FIG. 19 is a view illustrating current patterns of the 2W1-2-phase excitation made using the motor driving current according to the embodiment. In the IA, the drive current that is to be supplied to the A-phase coil of the motor, from a phase t0 to a phase t1, is maintained at 100%, at the phase t1 falls from the maximum value of 100% down to 91%, from the phase t1 to a phase t2 is maintained at 91%, at the phase t2 falls down to 83%, from the phase t2 to a phase t3 is maintained at 83%, at the phase t3 falls down to 71.4%, from the phase t3 to a phase t4 is maintained at 71.4%, at the phase t4 falls down to 55.5%, from the phase t4 to a phase t5 is maintained at 55.5%, at the phase t5 falls from 55.5% down to 40%, from the phase t5 to a phase t6 is maintained at 40%, at the phase t6 falls from 40% down to 20%, from the phase t6 to a phase t7 is maintained at 20%, at the phase t7 falls from 20% down to 0, and from the phase t7 to a phase t8 is maintained at 0.

Further, from the phase t8, the drive current falls from 0 down to −20%, from the phase t8 to a phase t9 is maintained at −20%, at the phase t9 falls from −20% down to −40%, from the phase t9 to a phase t10 is maintained at −40%, at the phase t10 falls down to −55.5%, from the phase t10 to a phase t11 is maintained at −55.5%, at the phase t11 falls from −55.5% down to −71.4%, from the phase t11 to a phase t12 is maintained at −71.4%, at the phase t12 falls down to −83%, from the phase t12 to a phase t13 is maintained at −83%, at the phase t13 falls down to −91%, from the phase t13 to a phase t14 is maintained at −91%, at the phase t14 falls down to a minimum value of −100%, and from the phase t14 to a phase t17 is maintained at −100%.

Conversely, at the phase t17, the drive current rises from the minimum value of −100% up to −91%, from the phase t17 to a phase t18 is maintained at −91%, at the phase t18 rises up to −83%, from the phase t18 to a phase t19 is maintained at −83%, at the phase t19 rises up to −71.4%, from the phase t19 to a phase t20 is maintained at −71.4%, at the phase t20 rises from −71.4% up to −55.5%, from the phase t20 to a phase t21 is maintained at −55.5%, at the phase t21 rises from −55.5% up to −40%, from the phase t21 to a phase t22 is maintained at −40%, at the phase t22 rises from −40% up to −20%, from the phase t22 to a phase t23 is maintained at −20%, at the phase t23 rises up to 0, and from the phase t23 to a phase t24 is maintained at 0.

At the phase t24 the drive current rises from 0 up to 20%, from the phase t24 to a phase t25 is maintained at 20%, at the phase t25 rises from 20% up to 40%, from the phase t25 to a phase t26 is maintained at 40%, at the phase t26 rises from 40% up to 55.5%, from the phase t26 to a phase t27 is maintained at 55.5%, at the phase t27 rises from 55.5% up to 71.4%, from the phase t27 to a phase t28 is maintained at 71.4%, at the phase t28 rises up to 83%, from the phase t28 to a phase t29 is maintained at 83%, at the phase t29 rises up to 91%, from the phase t29 to a phase t30 is maintained at 91%, at the phase t30 rises up to a maximum value of 100%, and from the phase t30 to a phase t32 is maintained at 100%. Thereafter, the drive current repeatedly exhibits the same waveform.

Also, in the IB current pattern, the drive current that is to be supplied to the B-phase coil of the motor has a waveform whose phase is delayed by the phases t8 from the drive current of the A phase.

Figure 17:
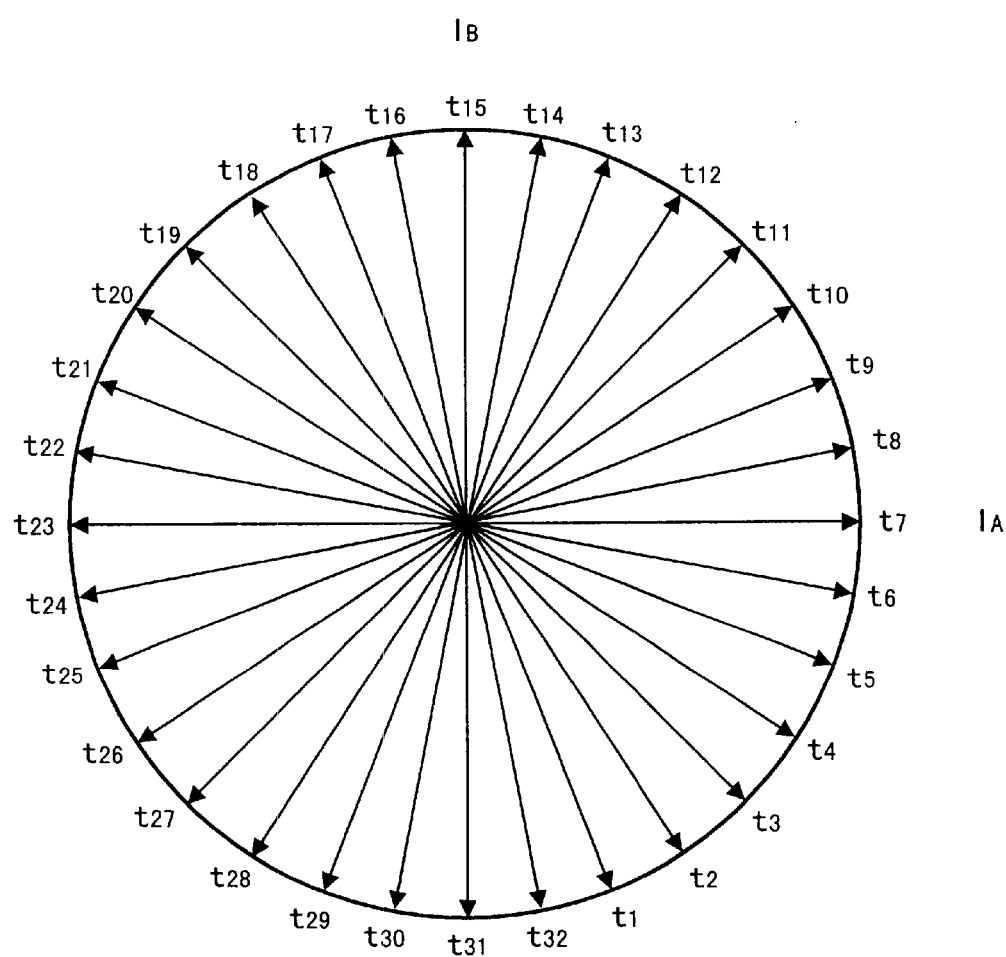
FIG. 17 is a view illustrating the rotation of the magnetic-field vectors of the 2W1-2-phase excitation according to the embodiment.

FIG. 17 is a view illustrating the rotation of the magnetic-field vectors of the 2W1-2-phase excitation according to the present embodiment. As illustrated in FIG. 17, the magnetic field vectors of the 2W1-2-phase excitation make their one full rotation with 32 steps from t1 to t32, and it is seen that the IA and the IB are shifted from each other by the phases t8.

[Method of Determining the Correction Drive Current Waveform]

In the stepping motor used in present embodiment, the magnetic poles of the stator side thereof are finely divided. Therefore, the stepping motor makes one full rotation by 5 rotations of the armature angle θ (one armature rotation is from 0 to 360 degrees), and the stepping motor is driven with the use of the method of micro-step driving. The above-described way of 2W1-2-phase excitation is used for the micro-step driving. As described above, the way of 2W1-2-phase excitation is the one that drives the stepping motor by dividing the armature angle from 0 to 360 degrees into 32 steps.

Also, the feed-shaft 28 of the rotating shaft of the stepping motor has a screw of 2-mm pitch formed thereon. And it is arranged that the optical pick-up 3 moves along this screw groove. Therefore, it results with one full rotation of the stepping motor that the optical pick-up 3 moves 2 mm. Accordingly, when the rotating angle of the stepping motor is converted in terms of the movement distance of the optical pick-up 3, theoretically, the stepping motor makes a rotation of 2.25 degrees with one step. And as a result the optical pick-up 3 moves 12.5 μm.

FIG. 7 is a view illustrating the motor driving waveforms (sine waves) that stand on the way of 2W1-2-phase excitation according to the present embodiment.

In FIG. 7, in the A and B phases, with the steps from 0 to 32 degrees the armature angle is caused to make one full rotation, during which 8-bit data that indicates the amplitude value is outputted.

As illustrated in the motor driving waveforms (sine waves) in the way of 2W1-2-phase excitation of FIG. 7, by causing the armature angle to make one full rotation with 32 steps through the use of the 2W1-2-phase excitation method, the stepping motor is driven in the form of micro-steps. Therefore, by measuring the movement distance of the optical pick-up in units of one step, there can be obtained a view illustrating a step-distance characteristic of sine wave according to the embodiment of FIG. 8.

Figure 8:
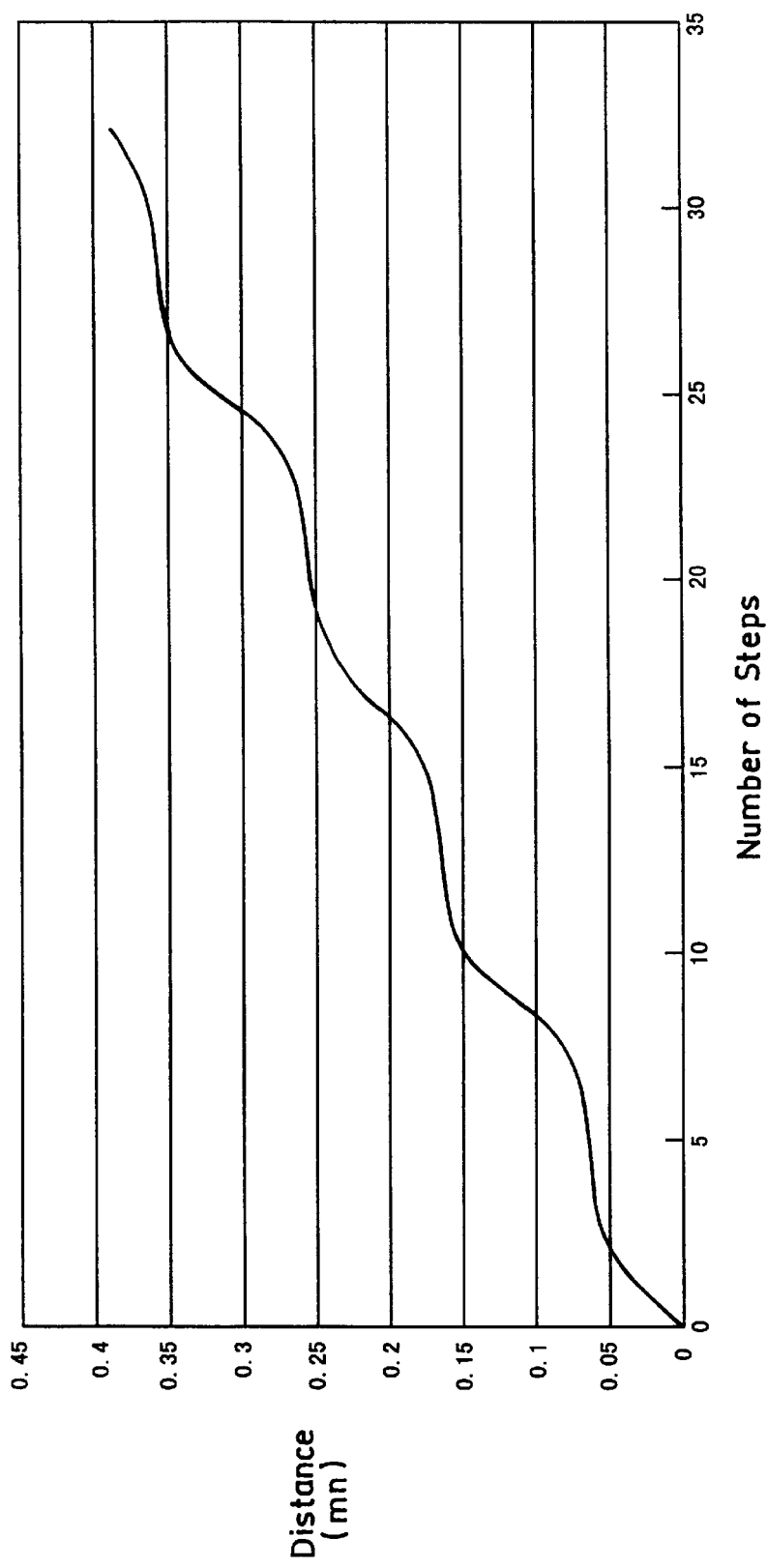
FIG. 8 is a view illustrating a step-distance characteristic based on the use of a sine wave, according to the embodiment.

As illustrated in FIG. 8, from 0th to 2nd step or so of the stepping motor, the optical pick-up advances a distance of from 0 to 0.05 mm. But from 2nd to 7th step or so the optical pick-up only advances a distance of from 0.05 to 0.06 mm. Also, from 7th to 10th step or so of the stepping motor the optical pick-up advances a distance of from 0.07 to 0.15 mm. But from 10th to 15th step or so the optical pick-up only advances a distance of from 0.15 to 0.175 mm. Also, from 15th to 20th or so of the stepping motor the optical pick-up advances a distance of from 0.175 to 0.25 mm. But from 20th to 23rd step or so the optical pick-up only advances a distance of from 0.25 to 0.265 mm. Also, from 23rd to 27th step or so of the stepping motor the optical pick-up advances a distance of from 0.265 to 0.35 mm. But from 27th to 32nd step or so the optical pick-up only advances a distance of from 0.35 to 0.38 mm.

In this way, in the relationship of step-distance, dense portions and less dense portions repeatedly occur. As seen from FIG. 8, the stepping motor does not rotate linearly.

The reason for this is due to the variation in the distribution of the magnetic field that occurs due to the fact that the magnetic-field distribution occurring due to the flow of an electric current into the A and B phases coils of the stepping motor does not exhibit a sinusoidal distribution. For example, between when the rotor is located correspondingly, or opposed, to the core and when the rotor is located at an intermediate position between the core and the adjacent core, the intensity of the magnetic field differs. Therefore, the direction itself of the magnetic field does not correctly reflects the current. In addition, for example, between when the rotor is located correspondingly to the core and when the rotor is located at an intermediate position between the core and the adjacent core, the direction of the magnetic field differs. Therefore, it is known that nor do the direction of the magnetic field and that of the rotor coincide with each other.

In the present embodiment, the drive current waveform for driving the stepping motor is corrected by using the waveform correcting means. By this correction, the embodiment cancels the effects resulting from the above-described variation in magnetic field to thereby linearly move the optical pick-up.

On this account, the movement distance of the optical pick-up that corresponds to one full rotation of the armature angle covering from 0th to 32nd step is divided into 64 equal parts to thereby determine the divisional (theoretical) distance. And in every 64-equally-divided movement distance (theoretical) the corresponding correction step number is read out from the 0th to the 32nd step. And, using this correction step number, the armature angle θ is determined. Here, since in the 2W1-2-phase excitation the armature angle of 90 degrees corresponds to 8 steps, the armature angle can be determined by using the following first equation.

[First Equation]

$$\text{Armature angle } \theta = 90/8 * \text{correction step number}$$

At this time, the (A-cos θ) of the A phase and the (B-sin θ) of the B phase can be determined by using the following second and third equations.

[Second Equation]

$$A\text{-}\cos \theta = \cos (\text{armature angle } \theta * \pi/180)$$

[Third Equation]

$$B\text{-}\sin \theta = \sin (\text{armature angle } \theta * \pi/180)$$

The data that is inputted to each of the A and B phases is 8 bit. Therefore, each of the A and B phases is represented by +128 pieces of data from 0 to +127 and −128 pieces of data from 0 to −127. The (A-8-bit) data that is data corresponding to 8 bits, which is with respect to the (A-cos θ) of the A phase, and the (B-8-bit) that is data corresponding to 8 bits, which is with respect to the (B-sin θ) of the B phase can be determined by using the following fourth and fifth equations.

[Fourth Equation]

$$A\text{-}8\text{-}bit = 127 \cos \theta$$

[Fifth Equation]

$$B\text{-}8\text{-}bit = 127 \sin \theta$$

Accordingly, if rounding the first one place less than the decimal point of each of the (A-8-bit) and (B-8-bit), it is possible to determine the bit (cos θ) of the A phase and the bit (sin θ) of the B phase.

As a result of this, as illustrated in correction tables of the embodiment in FIGS. 9 and 10, it is possible to determine correction tables each including step values from 0 to 64, distance values (theoretical), correction step values, armature angle θ values, A-cos θ values, A-8-bit values, bit values (cos θ), B-sin θ values, B-8-bit values, and bit values (sin θ).

Figure 11:
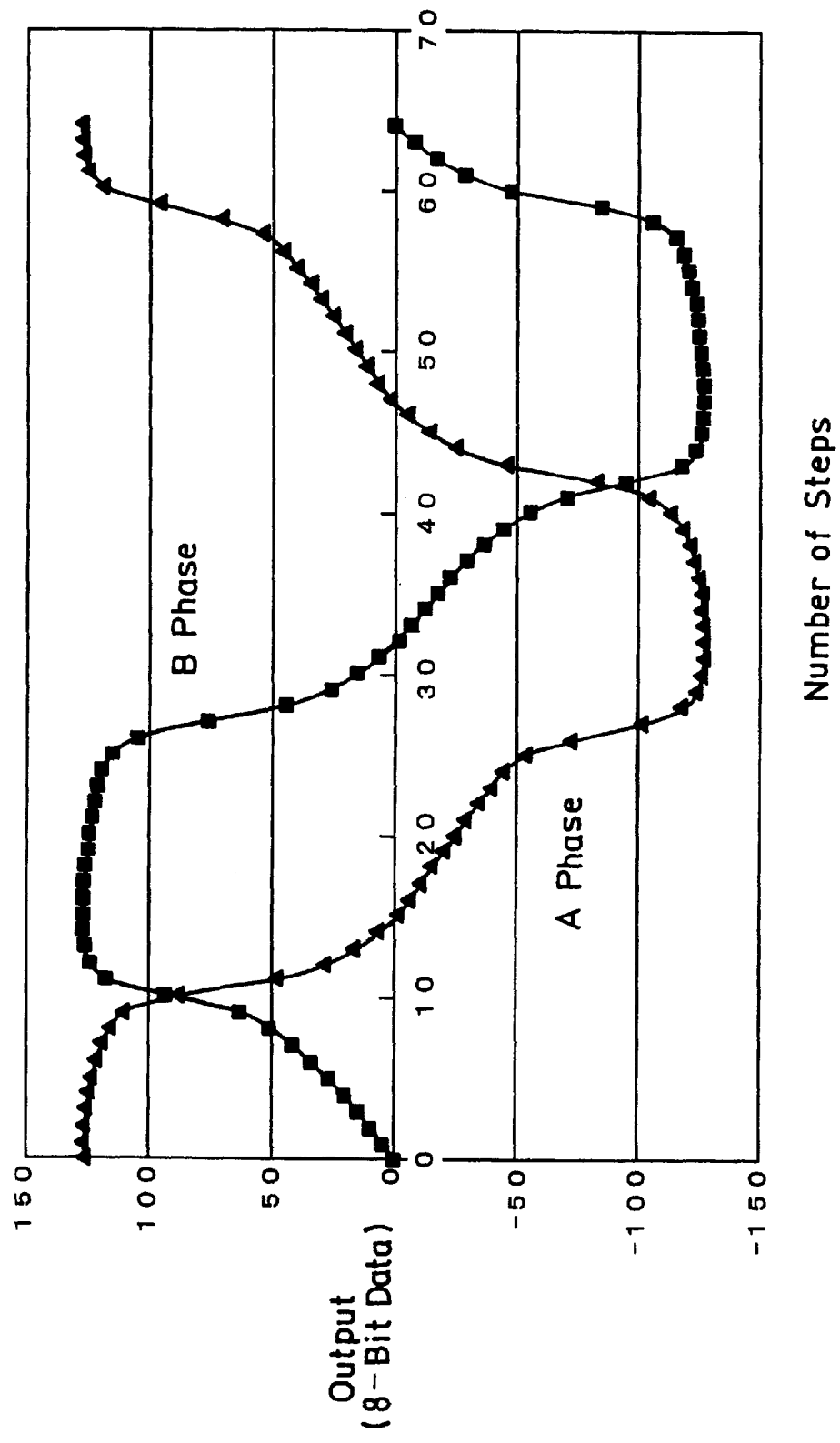
FIG. 11 is a view illustrating corrected motor driving waveforms according to the embodiment.

Accordingly, as the motor driving waveform (as corrected) diagram of the present embodiment illustrated in FIG. 11, based on those correction tables, it is possible to determine corrected motor driving waveforms corresponding to one full rotation of the armature angle, each of that is the 8-bit output data with respect to the steps from 0 to 64 that regards a corresponding one of the A phase and the B phase.

Figure 12:
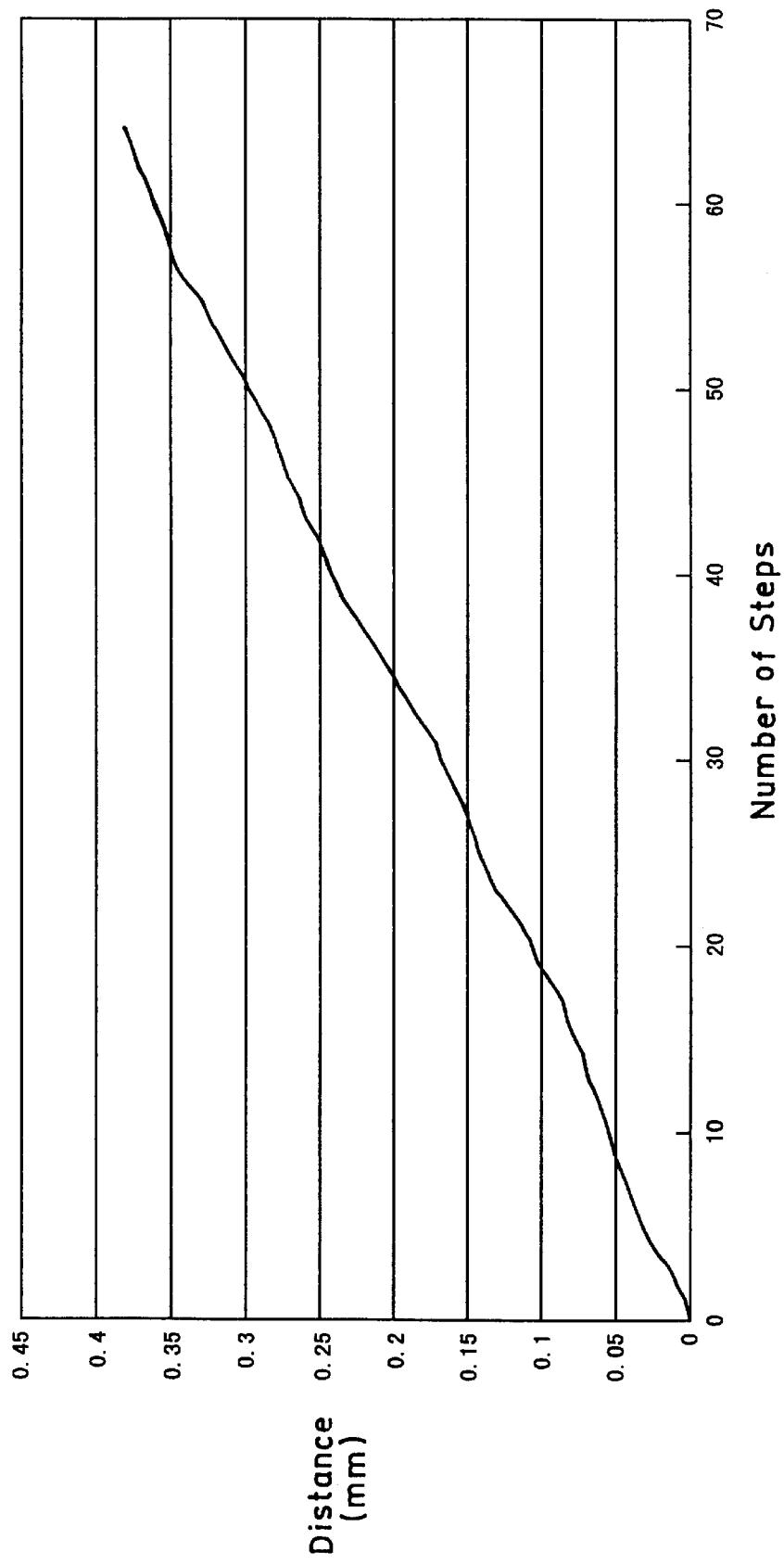
FIG. 12 is a view illustrating a step-distance characteristic based on the use of the corrected waveforms, according to the embodiment.

By using the motor driving waveforms of FIG. 11 corrected based on those correction tables, causing the armature angle to make one full rotation with 64 steps in accordance with the 4W1-2-phase excitation method and thereby causing the micro-step driving of the stepping motor and thereby measuring the movement distance of the optical pick-up in units of 1 step, there is obtained a view of FIG. 12 illustrating a step-distance characteristic based on the corrected waveforms according to the embodiment. As seen from FIG. 12, owing to the above-described correction, it has become possible to substantially linearly rotate the stepping motor.

In the above-described embodiment, an explanation has been given of the method of dividing the movement distance of the optical pick-up when performing the 2W1-2-phase excitation into 64 equal parts, dividing 32 steps more finely, thereby determining correction steps, thereby determining the armature angles from these correction steps, determining the cos θ and sin θ based on these armature angles, determining 8-bit data from the use thereof to determine correction tables, and performing the 4W1-2-excitation with 64 steps according to these correction tables. However, the invention is not limited to this method only.

For example, 2W1-2-phase excitation may be also performed in such a way as to divide the movement distance of the optical pick-up when 2W1-2-phase excitation is performed into 32 equal parts, thereby determine correction steps with respect to the 32 steps, determine the armature angles from these correction steps, determine the cos θ and sin θ based on these armature angles, determine 8-bit data from the use thereof to determine correction tables, and perform the 2W1-2-excitation with 32 steps according to these correction tables.

Also, for example, the method of determining the correction drive current waveforms according to this embodiment can be also applied to the 4W1-2-phase excitation. Hereinafter, the way of determining correction tables when 4W1-2-phase excitation is performed will be explained.

FIG. 20 is a view illustrating the motor driving waveforms (sine waves) when 4W1-2-phase excitation is performed according to this embodiment.

In FIG. 20, regarding each of the A and B phases, the armature angle is caused to make one full rotation with steps from 0 to 64 to thereby output 8-bit data that indicates the amplitude values.

As illustrated in the motor driving waveforms (sine waves) when 4W1-2-phase excitation is performed in FIG. 20, the stepping motor is micro-step driven by causing the armature angle to make one full rotation with 64 steps in accordance with the 4W1-2-phase excitation method. In this view, by measuring the movement distance of the optical pick-up per step, it is possible to obtain a view illustrating a step-distance characteristic with 64 steps, that corresponds to the step-distance characteristic with sine waves according to this embodiment shown in FIG. 8.

On this account, the movement distance of the optical pick-up that corresponds to one full rotation of the armature angle covering from 0th to 64th step is divided into 128 equal parts to thereby determine the divisional (theoretical) distance. And in every 128-equally-divided movement distance (theoretical) the corresponding correction step number is read out from the 0th to the 64th step. And, by using this correction step number, the armature angle θ is determined. Here, since in the 4W1-2-phase excitation the armature angle of 90 degrees corresponds to 16 steps, the armature angle can be determined by using the following sixth equation.

[Sixth Equation]

Armature angle θ=90/16*correction step number

And it may be also arranged to perform the excitation corresponding to 8W1-2-phase excitation, that divides the movement distance of the optical pick-up when 4W1-2-phase excitation is performed into 128 equal parts, thereby determines correction steps with respect to the 64 steps, determines the armature angles from these correction steps, determines the cos θ and sin θ based on these armature angles, determines 8-bit data from the use thereof to determine correction tables, and rotates with, for example, 128 steps every 2.8125 degrees according to these correction tables.

Also, it may be also arranged to divide the movement distance of the optical pick-up when 4W1-2-phase excitation is performed into 64 equal parts, thereby determine correction steps with respect to the 64 steps, determine the armature angles from these correction steps, determine the cos θ and sin θ based on these armature angles, determine 8-bit data from the use thereof to determine correction tables, and perform 4W1-2 excitation with 64 steps according to these correction tables.

Incidentally, the ordinary reproduction operation of the optical disk apparatus will be performed as follows.

A laser beam is radiated from the optical pick-up 3 of optical system onto the optical disk that is rotated by the spindle motor 2 that is servo controlled by a spindle servo-system of the servo circuit. After the focus servo that is controlled by the focus servo-system is turned on, a drive signal from the tracking servo-system of the servo-circuit is amplified by the drive amplifier 26 and this drive signal is applied to the tracking coil 12 of the bi-axial actuator of the optical pick-up 3 of optical system. When the actuator is resultantly being moved in the track-crossing direction, a detection signal is detected from the photo-detector 11 of optical system in response to the light reflected from the optical disk. Also, a drive signal from the focus servo-system of the servo-circuit is amplified by the drive amplifier 22 and this drive signal is applied to the focus coil 13 of the bi-axial actuator of the optical pick-up 3 of optical system. When the actuator is resultantly being moved in the focus direction, a detection signal is detected from the photo-detector 11 of optical system in response to the light reflected from the optical disk.

The tracking error signal that has been generated through the operation of the servo circuit is amplified by the drive amplifier 26, and this signal is made to be a tracking actuator drive signal, which is applied to the tracking coil 12 of the bi-axial actuator of the optical pick-up 3 of optical system. Also, the focus error signal that has been generated through the operation of the servo circuit is amplified by the drive amplifier 22, and this signal is made to be a focus actuator drive signal, which is applied to the focus coil 13 of the bi-axial actuator of the optical pick-up 3 of optical system.

It is to be noted that, in the optical pick-up of optical system, the objective lens 8 is independently moved in the focus direction (the direction of its being moved toward or away from the optical disk 1) and in the tracking direction (the direction of its crossing the track of the optical disk) through the operation of the bi-axial actuator using an electromagnetic force.

Also, especially, in this embodiment, the waveform correcting means constituted by the micro-controller 31 and the slide-feed motor controller 32 corrects the motor driving waveforms to thereby cause the optical pick-up to linearly move with respect to the rotation of the slide-feed motor 14. As a result of this, the optical pick-up of optical system is sequentially linearly moved toward the outer periphery of the optical disk in synchronism with the rotation of the optical disk by the slide-feed (sled) motor 14. As a result of this, the radiation position of a laser beam is sequentially linearly displaced toward the outer periphery of the optical disk.

Incidentally, the RF amplifier of the reproduction signal processing circuit 15 generates a reproduction RF signal from the light reflected from the optical disk. It is to be noted that the reproduction RF signal is demodulated in the reproduction signal processing circuit and this signal is subjected to the detection of its error correction code, then to de-interleave processing, and then to EFM-PLUS demodulation processing. And the resulting demodulation signal is amplified up to a level that is able to be outputted, and the resulting signal is outputted.

Also, the system controller generates a control signal that is to be sent to the servo circuit, a control signal for setting the gain that is to be sent to a gain setting portion of the servo circuit, etc. according to the RF signal from the RF amplifier. In addition, the system controller controls the signal processing of a data signal processing portion and the operations of the respective parts.

In the optical disk driving apparatus of the present embodiment, having the slide-feed drive portion 27 that, in order to record information into an optical disk and reproduce information therefrom by radiating an optical spot onto the optical disk 1 by the optical pick-up 3, causes a change of the incident position of the optical spot radiated from the optical pick-up with respect to a rotation surface of the optical disk, the slide-feed drive portion 27 uses the stepping motor 14 as drive means for changing the position of the optical pick-up 3 with respect to the rotation surface of the optical disk 1 and has the micro-controller 31 provided therein and the slide-feed motor controller 32 both for correcting drive current waveforms to drive the stepping motor 14, the both controller serving as waveform correcting means. Therefore, by correcting the motor driving waveforms by the waveform correcting means, the optical pick-up 3 can be linearly moved with respect to the rotation of the slide-feed motor 14. It is thereby possible to do away with a position sensor and make a fine positional control of the optical pick-up 3 with no variation. Also, since the waveform correcting means of the slide-feed drive portion 27 can be constructed of a digital signal processor (DSP), at its succeeding stage a general-purpose power amplifier can be used as it is. Therefore, the cost can be reduced compared to the use of a drive IC for exclusive use on a stepping motor. Further, since the rotating shaft of the motor can be directly used as the feed shaft for feeding the optical disk, it is possible to make the slide-feed drive portion 27 small in size and make the optical disk driving apparatus small in size.

Also, the optical disk driving apparatus of the embodiment has a construction wherein in said optical disk driving apparatus the micro-controller 31 and slide-feed motor controller 32 serving as waveform correcting means have stored information on correction steps such that the respective movement distances of the optical pick-up corresponding to the drive steps of correction drive current waveforms become equal. Therefore, there are no needs to provide a calculation portion, and it is possible to directly read out correction drive current waveforms from among the pieces of stored information and drive the slide-feed motor with a simple construction.

Also, the optical disk driving apparatus of the embodiment has a construction wherein in said optical disk driving apparatus the micro-controller 31 and slide-feed motor controller 32 serving as waveform correcting means determines the relationship of drive steps of the drive current waveform and the movement distance of the optical pick-up 3 with respect to the drive steps, divides this movement distance into equal parts at prescribed intervals to thereby determine their corresponding correction step number values, determines armature angles with respect to the correction steps, and generates correction drive current waveforms based on the armature angles. Therefore, by performing the rotation of the slide-feed motor 14 using the armature angles based on the correction steps, it is possible to make linear the relationship of the rotation of the slide-feed motor 14 and the movement distance of the optical pick-up 3.

Also, the optical disk driving method is the one that performs slide-feed driving that, in order to record information into an optical disk 1 and reproduce information therefrom by radiating an optical spot onto the optical disk by an optical pick-up 3, causes a change of the incident position of the optical spot radiated from the optical pick-up 3 with respect to a rotation surface of the optical disk 1, and in that the slide-feed driving comprises correcting drive current waveforms for driving the stepping motor 14 to thereby generate correction drive current waveforms, using the stepping motor 14 when there is performed a drive for changing the position of the optical pick-up 3 with respect to the rotation surface of the optical disk 1, and driving the stepping motor 14 with the use of the correction drive current waveforms. Therefore, by correcting the motor driving waveforms, the optical pick-up 3 can be linearly moved with respect to the rotation of the slide-feed motor 14. It is thereby possible to make unnecessary the processing performed using a position sensor and make a fine positional control of the optical pick-up 3 with no variation. Also, since the correction of the slide-feed drive waveforms can be performed with a digital signal processor (DSP), at its succeeding stage a general-purpose power amplifier can be used as it is. Therefore, the cost can be reduced compared to the use of a drive IC for exclusive use on a stepping motor. Further, since the rotating shaft of the motor can be directly used as the feed shaft for feeding the optical disk, it is possible to make the slide-feed drive processing simple and thereby to simplify the optical disk driving method.

Also, the optical disk driving method of the embodiment is the one that in said method generates correction drive waveforms by using stored information on correction steps such that the respective movement distances of the optical pick-up 3 corresponding to the drive steps of correction drive current waveforms become equal. Therefore, there are no needs to provide a calculation portion, and it is possible to directly read out correction drive current waveforms from among the pieces of stored information and drive the slide-feed motor 14 with a simple construction.

Also, the optical disk driving method of the embodiment has a construction wherein in said method determination is made of the relationship of drive step number values of the drive current waveform and the movement distance of the optical pick-up 3 with respect to the drive step number values, division is made of this movement distance into equal parts at prescribed intervals to thereby determine their corresponding correction steps, determination is made of armature angles with respect to the correction steps, and generation is made of the correction drive current waveforms based on the armature angles. Therefore, by performing the rotation of the slide-feed motor 14 using the armature angles based on the correction steps, it is possible to make linear the relationship of the rotation of the slide-feed motor 14 and the movement distance of the optical pick-up 3.

Also, the optical disk apparatus of the embodiment is the one that has a slide-feed drive part 27 that, in order to record information into an optical disk 1 and reproduce information therefrom by radiating an optical spot onto the optical disk 1 by an optical pick-up 3, causes a change of the incident position of the optical spot radiated from the optical pick-up with respect to a rotation surface of the optical disk, and in that the slide-feed drive part 27 uses a stepping motor 14 as drive means for changing the position of the optical pick-up 3 with respect to the rotation surface of the optical disk 1 and has the micro-controller 31 provided therein and the slide-feed motor controller 32 constituting waveform correcting means for correcting drive current waveforms for driving the stepping motor 14. Therefore, by correcting the motor driving waveforms by the waveform correcting means, the optical pick-up 3 can be linearly moved with respect to the rotation of the slide-feed motor 14. It is thereby possible to make unnecessary the use of a position sensor and make a fine positional control of the optical pick-up 3 with no variation. Also, since the waveform correcting means of the slide-feed drive part can be performed with a digital signal processor (DSP), at its succeeding stage a general-purpose power amplifier can be used as it is. Therefore, the cost can be reduced compared to the use of a drive IC for exclusive use on a stepping motor. Further, since the rotating shaft of the motor can be directly used as the feed shaft for feeding the optical disk, it is possible to make the slide-feed drive portion 27 small in size and thereby to miniaturize the optical disk apparatus.

Incidentally, in the above-described embodiment, only an example wherein the invention has been applied to the slide-feed mechanism of the optical disk apparatus has been shown. Needless to say, the invention can of course be applied to a slide-feed drive apparatus of a card reader apparatus wherein a stepping motor is used as the slide-feed motor and of other electronic devices each having a plate-like recording medium.

The optical disk driving apparatus of the present invention is the one that has the slide-feed drive portion that, in order to record information into an optical disk and reproduce information therefrom by radiating an optical spot onto the optical disk by the optical pick-up, causes a change of the incident position of the optical spot radiated from the optical pick-up with respect to a rotation surface of the optical disk, and in that the slide-feed drive portion uses the stepping motor as drive means for changing the position of the optical pick-up with respect to the rotation surface of the optical disk 1 and has provided therein the waveform correcting means for correcting drive current waveforms for driving the stepping motor. Therefore, the following advantages can be brought about. Namely, by correcting the motor driving waveforms by the waveform correcting means, the optical pick-up can be linearly moved with respect to the rotation of the slide-feed motor. It is thereby possible to do away with a position sensor and make a fine positional control of the optical pick-up with no variation. Also, since the waveform correcting means of the slide-feed drive part can be constructed of a digital signal processor (DSP), at its succeeding stage a general-purpose power amplifier can be used as is. Therefore, the cost can be reduced compared to the use of a drive IC for exclusive use on a stepping motor. Further, since the rotating shaft of the motor can be directly used as the feed shaft for feeding the optical disk, it is possible to make the slide-feed drive part small in size and make the optical disk driving apparatus small in size.

Also, the optical disk driving apparatus of the present invention has a construction wherein in said optical disk driving apparatus the waveform correcting means has stored information on correction steps such that the respective movement distances of the optical pick-up corresponding to the drive steps of correction drive current waveforms become equal. Therefore, the following advantages can be brought about. Namely, there are no needs to provide a calculation portion, and it is possible to directly read out correction drive current waveforms from among the pieces of stored information and drive the slide-feed motor with a simple construction.

Also, the optical disk driving apparatus of the present invention has a construction wherein in said optical disk driving apparatus the waveform correcting means determines the relationship of drive steps of the drive current waveform and the movement distance of the optical pick-up with respect to the drive steps, divides this movement distance into equal parts at prescribed intervals to thereby determine their corresponding correction step number values, determines armature angles with respect to the correction steps, and generates correction drive current waveforms based on the armature angles. Therefore, the following advantages can be brought about. Namely, by performing the rotation of the slide-feed motor using the armature angles based on the correction steps, it is possible to make linear the relationship of the rotation of the slide-feed motor and the movement distance of the optical pick-up.

Also, the optical disk driving method of the present invention is the one that performs slide-feed driving that, in order to record information into an optical disk and reproduce information therefrom by radiating an optical spot onto the optical disk by an optical pick-up, causes a change of the incident position of the optical spot radiated from the optical pick-up with respect to a rotation surface of the optical disk, and in that the slide-feed driving comprises correcting drive current waveforms for driving the stepping motor to thereby generate correction drive current waveforms, using the stepping motor when there is performed a drive for changing the position of the optical pick-up with respect to the rotation surface of the optical disk, and driving the stepping motor with the use of the correction drive current waveforms. Therefore, the following advantages can be brought about. Namely, by correcting the motor driving waveforms, the optical pick-up can be linearly moved with respect to the rotation of the slide-feed motor. It is thereby possible to make unnecessary the processing performed by using a position sensor and make a fine positional control of the optical pick-up with no variation. Also, since the correction of the slide-feed drive waveforms can be performed with a digital signal processor (DSP), at its succeeding stage a general-purpose power amplifier can be used as it is. Therefore, the cost can be reduced compared to the use of a drive IC for exclusive use on a stepping motor. Further, since the rotating shaft of the motor can be directly used as the feed shaft for feeding the optical disk, it is possible to make the slide-feed drive processing simple and thereby to simplify the optical disk driving method.

Also, the optical disk driving method of the present invention is the one that in said method generates the correction drive waveforms using stored information on correction steps such that the respective movement distances of the optical pick-up corresponding to the drive steps of the correction drive current waveforms become equal. Therefore, the following advantages can be obtained. Namely, there are no needs to provide a calculation portion, and it is possible to directly read out the correction drive current waveforms from among the pieces of stored information and drive the slide-feed motor with a simple construction.

Also, the optical disk driving method of the present invention has a construction wherein in said method determination is made of the relationship of drive step number values of the drive current waveform and the movement distance of the optical pick-up with respect to the drive step number values, division is made of this movement distance into equal parts at prescribed intervals to thereby determine their corresponding correction steps, determination is made of armature angles with respect to the correction steps, and generation is made of the correction drive current waveforms based on the armature angles. Therefore, the following advantage can be obtained. Namely, by performing the rotation of the slide-feed motor using the armature angles based on the correction steps, it is possible to make linear the relationship of the rotation of the slide-feed motor and the movement distance of the optical pick-up.

Also, the optical disk apparatus of the present invention is the one that has a slide-feed drive portion that, in order to record information into an optical disk and reproduce information therefrom by radiating an optical spot onto the optical disk by an optical pick-up, causes a change of the incident position of the optical spot radiated from the optical pick-up with respect to a rotation surface of the optical disk, and in that the slide-feed drive part uses a stepping motor as drive means for changing the position of the optical pick-up with respect to the rotation surface of the optical disk and has the waveform correcting means provided therein for correcting drive current waveforms to drive the stepping motor. Therefore, the following advantages can be obtained. Namely, by correcting the motor driving waveforms by the waveform correcting means, the optical pick-up can be linearly moved with respect to the rotation of the slide-feed motor. It is thereby possible to make unnecessary the use of a position sensor and make a fine positional control of the optical pick-up with no variation. Also, since the waveform correcting means of the slide-feed drive portion can be performed with a digital signal processor (DSP), at its succeeding stage a general-purpose power amplifier can be used as it is. Therefore, the cost can be reduced compared to the use of a drive IC for exclusive use on a stepping motor. Further, since the rotating shaft of the motor can be directly used as the feed shaft for feeding the optical disk, it is possible to make the slide-feed drive portion small in size and thereby to miniaturize the optical disk apparatus.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical disk driving apparatus having a slide-feed drive portion that, in order to record information into an optical disk or reproduce information therefrom by radiating an optical spot onto said optical disk by an optical pick-up, causes a change of the incident position of the optical spot radiated from said optical pick-up with respect to a rotation surface of the optical disk, said slide-feed drive portion using a rotating stepping motor as drive means for changing the position of said optical pick-up with respect to the rotation surface of said optical disk, and comprising waveform generating means for generating a drive current waveform to drive said stepping motor in steps, said drive current waveform having a variation as a function of said steps sufficient to cause each step to produce a substantially equal movement distance of said optical pick-up.

2. An optical disk driving apparatus according to claim 1, wherein
said waveform generating means has stored information on correction steps such that the respective movement distances of said optical pick-up corresponding to the drive steps of the drive current waveform become equal.

3. An optical disk driving apparatus having a slide-feed drive portion that, in order to record information into an optical disk or reproduce information therefrom by radiating an optical spot onto said optical disk by an optical pick-up, causes a change of the incident position of the optical spot radiated from said optical pick-up with respect to a rotation surface of the optical disk, said slide-feed drive portion using a stepping motor as drive means for changing the position of said optical pick-up with respect to the rotation surface of said optical disk, and comprising waveform correcting means for correcting drive current waveforms for driving said stepping motor;

wherein said waveform correcting means determines the relationship of drive steps of the drive current waveform and a movement distance of said optical pick-up with respect to said drive steps, divides said movement distance into equal parts at prescribed intervals to thereby determine their corresponding correction step number values, determines armature angles with respect to the correction steps, and generates correction drive current waveforms based on the armature angles.

4. An optical disk driving method performing slide-feed driving that, in order to record information into an optical disk or reproduce information therefrom by radiating an optical spot onto said optical disk by an optical pick-up, causes a change of the incident position of the optical spot radiated from said optical pick-up with respect to a rotation surface of said optical disk, said slide-feed driving comprising generating drive current waveforms for driving a rotating stepping motor to cause a change in position of said optical pick-up, thereby causing said change in optical spot incident position, said stepping motor being driven in steps with the use of said drive current waveforms, said drive current waveforms having a variation as a function of said steps sufficient to cause each step to produce a substantially equal movement distance of said optical pick-up.

5. An optical disk driving method according to claim 4, wherein
said drive waveforms are generated by using stored information on correction steps such that said respective movement distances of optical pick-up corresponding to said drive steps of the drive current waveforms become equal.

6. An optical disk driving method performing slide-feed driving that, in order to record information into an optical disk or reproduce information therefrom by radiating an optical spot onto said optical disk by an optical pick-up, causes a change of the incident position of the optical spot radiated from said optical pick-up with respect to a rotation surface of said optical disk, said slide-feed driving comprising correcting drive current waveforms to thereby generate correction drive current waveforms, applying said correction waveforms to a stepping motor to drive the stepping motor in steps, thereby changing the position of said optical pick-up and causing said change in optical spot incident position;

wherein said correction waveforms are generated by determining the relationship between drive steps of said drive current waveform and the movement distance of said optical pick-up, dividing said movement distance into equal parts at prescribed intervals to thereby determine their corresponding correction steps, determining armature angles with respect to said correction steps, and generating said correction drive current waveforms based on the armature angles.

7. An optical disk apparatus having a slide-feed drive portion that, in order to record information into an optical disk or reproduce information therefrom by radiating an optical spot onto said optical disk by an optical pick-up, causes a change of the incident position of the optical spot radiated from said optical pick-up with respect to a rotation surface of the optical disk, said slide-feed drive portion using a rotating stepping motor as drive means for changing the position of said optical pick-up with respect to the rotation surface of said optical disk, and comprising waveform generating means for generating a drive current waveform to drive said stepping motor in steps, said drive current waveform having a variation as a function of said steps sufficient to cause each step to produce a substantially equal movement distance of said optical pick-up.

8. The optical disk driving apparatus of claim 1 wherein said variation of said drive current waveform is that of a distorted sinusoid as a function of said stepping motor steps.

9. The optical disk driving apparatus of claim 1 wherein said waveform generating means generates multiple drive current waveforms for multiple respective phases of said stepping motor, each of said drive current waveforms varying as a distorted sinusoid as a function of said stepping motor steps.

10. The optical disk driving method of claim 4 wherein said variation of said drive current waveform is that of a distorted sinusoid as a function of said stepping motor steps.

11. The optical disk driving method of claim 4 wherein said waveform generator generates multiple drive current waveforms for multiple respective phases of said stepping motor, each of said drive current waveforms varying as a distorted sinusoid as a function of said stepping motor steps.

12. The optical disk apparatus of claim 7 wherein said variation of said drive current waveform is that of a distorted sinusoid as a function of said stepping motor steps.

13. The optical disk apparatus of claim 7 wherein said waveform generating means generates multiple drive current waveforms for multiple respective phases of said stepping motor, each of said drive current waveforms varying as a distorted sinusoid as a function of said stepping motor steps.

* * * * *